United States Patent
Kawasaki

(10) Patent No.: US 9,924,472 B2
(45) Date of Patent: Mar. 20, 2018

(54) WIRELESS COMMUNICATION METHOD, WIRELESS COMMUNICATION SYSTEM, WIRELESS BASE STATION AND WIRELESS TERMINAL

(71) Applicant: FUJITSU LIMITED, Kawasaki-shi, Kanagawa (JP)

(72) Inventor: Yoshihiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/090,133

(22) Filed: Apr. 4, 2016

(65) Prior Publication Data
US 2016/0219528 A1   Jul. 28, 2016

Related U.S. Application Data

(63) Continuation of application No. PCT/JP2013/006359, filed on Oct. 28, 2013.

(51) Int. Cl.
*H04B 5/00* (2006.01)
*H04B 7/00* (2006.01)
(Continued)

(52) U.S. Cl.
CPC ....... *H04W 52/241* (2013.01); *H04W 28/048* (2013.01); *H04W 52/383* (2013.01); *H04W 72/085* (2013.01); *H04W 76/023* (2013.01)

(58) Field of Classification Search
CPC ... H04W 52/241; H04W 52/34; H04W 52/36; H04W 52/383; H04W 28/048;
(Continued)

(56) References Cited

U.S. PATENT DOCUMENTS 8,521,886 B2 *  8/2013  Wang .................. H04W 76/023
                                                    370/229
2008/0242338 A1  10/2008  Yamamoto
(Continued)

FOREIGN PATENT DOCUMENTS

JP   2008-244960 A   9/2008
JP   2008-244960 A   10/2008
(Continued)

OTHER PUBLICATIONS

Extended European search report with supplementary European search report and the European search opinion issued by the European Patent Office for corresponding European Patent Application No. 13896254.3 dated Sep. 22, 2016.
(Continued)

*Primary Examiner* — Yuwen Pan
*Assistant Examiner* — Paul P Tran
(74) *Attorney, Agent, or Firm* — Myers Wolin, LLC

(57) ABSTRACT

A wireless communication method including: transmitting first information from a second wireless terminal to a wireless base station, the first information relating to a first wireless quality from a first wireless terminal to the second wireless terminal, the first wireless quality being measured based on a first reference signal transmitted from the first wireless terminal, the wireless base station being configured to determine whether to perform device-to-device communication between the first wireless terminal and the second wireless terminal, and transmitting second information from the first wireless terminal to the wireless base station, the second information relating to a second wireless quality from the second wireless terminal to the first wireless terminal, the second wireless quality being measured based on a second reference signal transmitted from the second wireless terminal.

7 Claims, 10 Drawing Sheets

(51) Int. Cl.

| | | |
|---|---|---|
| *H04M 3/42* | (2006.01) | |
| *H04W 24/00* | (2009.01) | |
| *H04Q 5/22* | (2006.01) | |
| *G08B 1/08* | (2006.01) | |
| *G01R 31/08* | (2006.01) | |
| *G06F 11/00* | (2006.01) | |
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04W 4/00* | (2009.01) | |
| *H04J 3/00* | (2006.01) | |
| *H04B 7/212* | (2006.01) | |
| *H04B 1/00* | (2006.01) | |
| *H04K 1/10* | (2006.01) | |
| *H04L 27/28* | (2006.01) | |
| *H04K 1/00* | (2006.01) | |
| *G06Q 30/00* | (2012.01) | |
| *H04W 52/24* | (2009.01) | |
| *H04W 76/02* | (2009.01) | |
| *H04W 28/04* | (2009.01) | |
| *H04W 72/08* | (2009.01) | |
| *H04W 52/38* | (2009.01) | |

(58) Field of Classification Search
CPC . H04W 72/085; H04W 76/023; H04W 4/008; H04W 4/02; H04W 4/028; H04W 4/043; H04W 4/206; H04W 48/08; H04W 52/02; G06F 21/60; G06K 7/0008; G06K 7/10128; G06K 7/10237; G06K 19/0723; G06Q 10/087; G06Q 10/0833; G06Q 30/02; G06Q 30/0601; G06Q 30/0623; H04L 69/18; H04M 1/7253; H04M 3/4878
USPC ....... 455/41.1, 41.2, 67.13, 69, 115.1, 115.2, 455/115.3, 115.4, 127.1, 127.2, 226.1, 455/226.2, 226.3, 234, 343, 404.2, 405, 455/418, 419, 420, 425, 440, 442, 447, 455/452.1, 452.2, 455, 456.1, 456.2, 502, 455/515, 517, 522, 574; 370/203, 204, 370/208, 229, 230, 280, 244, 245, 310, 370/311, 318, 319, 320, 321, 328, 329, 370/331, 332, 333, 334, 335, 336, 337, 370/342, 343, 347, 348, 350, 377, 394, 370/395.4, 473, 506; 375/141, 150, 190, 375/260
See application file for complete search history.

(56) References Cited

U.S. PATENT DOCUMENTS

| | | | | |
|---|---|---|---|---|
| 2009/0017850 A1* | 1/2009 | Jovicic | ................ | H04W 52/34 455/501 |
| 2009/0325625 A1* | 12/2009 | Hugl | .................... | H04W 52/16 455/522 |
| 2010/0093364 A1* | 4/2010 | Ribeiro | ............... | H04W 72/082 455/452.2 |
| 2011/0275382 A1* | 11/2011 | Hakola | ................. | H04W 24/10 455/452.2 |
| 2013/0029713 A1* | 1/2013 | Jang | ..................... | H04W 24/10 455/517 |
| 2013/0295983 A1* | 11/2013 | Kim | .................... | H04W 52/146 455/522 |
| 2014/0003262 A1* | 1/2014 | He | ........................ | H04W 28/08 370/252 |
| 2014/0018010 A1* | 1/2014 | Gao | .................... | H04W 72/085 455/67.13 |
| 2014/0120934 A1 | 5/2014 | Kishiyama | | |
| 2014/0219116 A1* | 8/2014 | Iwamura | ............... | H04W 24/10 370/252 |

FOREIGN PATENT DOCUMENTS

| | | |
|---|---|---|
| JP | 2011-097185 A | 5/2011 |
| JP | 2011-97185 A | 5/2011 |
| JP | 2012-217104 A | 11/2012 |
| JP | 2013-034165 A | 2/2013 |
| JP | 2013-34165 A | 2/2013 |

OTHER PUBLICATIONS

3GPP TR 22.803 V12.2.0, "3rd Generation Partnership Project; Technical Specification Group Services and System Aspects; Feasibility study for Proximity Services (ProSe) (Release 12)", Jun. 2013.
International Search Report with Written Opinion of the International Searching Authority issued for corresponding International Patent Application No. PCT/JP2013/006359, dated Dec. 10, 2013, with an English translation.
3GPP TR 22.803 V12.1.0, "3rd Generation Partnership Project; Technical Specification Group Services and System Aspects; Feasibility study for Proximity Services (ProSe) (Release 12)", Mar. 2013.
Qualcomm Incorporated, "Study on LTE Device to Device Proximity Services", Agenda Item: 13.2, 3GPP TSG-RAN Meeting #58, RP-122009, Barcelona, Spain, Dec. 4-7, 2012.
Notification of Reasons for Refusal issued by the Japan Patent Office for corresponding Japanese Patent Application No. 2015-544616, dated Jun. 20, 2017, with an English translation.

* cited by examiner

WIRELESS COMMUNICATION METHOD, WIRELESS COMMUNICATION SYSTEM, WIRELESS BASE STATION AND WIRELESS TERMINAL

CROSS-REFERENCE TO RELATED APPLICATION

This application is a continuation application of International Application PCT/JP2013/006359 filed on Oct. 28, 2013 and designated the U.S., the entire contents of which are incorporated herein by reference.

FIELD

The present invention relates to a wireless communication method, a wireless communication system, a wireless base station, and a wireless terminal.

BACKGROUND

In recent years, in a wireless communication system (a cellular system) including a wireless base station such as a mobile telephone system, discussion on next generation wireless communication technologies has been performed to further enhance high speed and high capacity wireless communication. For example, communication standards called Long Term Evolution (LTE) and communication standards called LTE-Advanced (LTE-A) that is based on an LTE wireless communication technology have been proposed by the 3rd Generation Partnership Project (3GPP) that is a standard body. "LTE" is hereinafter defined as including other wireless communication systems that are enhancements of LTE and LTE-A, as well as LTE and LTE-A, unless otherwise specified.

LTE (LTE-A) includes various technologies, one of which is device-to-device (D2D) communication. The D2D communication is so-called inter-terminal communication in the 3GPP. For example, many wireless terminals, although positioned a short distance away from one another, normally perform communication through a wireless base station in LTE. In contrast, according to the D2D communication, wireless terminals can perform direct communication without the wireless base station being involved.

According to the D2D communication, the communication among the wireless terminals is possible even in a case where the communication in which the wireless base station is involved is not performed, for example, when a disaster occurs (this is defined as a public safety scenario in the 3GPP). Furthermore, it is thought that the D2D communication promisingly finds application in machine type communication (MTC) as well that is equivalent to so-called machine-to-machine (M2M) communication in the 3GPP. It is thought that in the MTC which has been discussed in the 3GPP, inter-terminal communication is performed through the wireless base station, but that multiple devices are grouped in a certain area and the application of the D2D communication to communication within the device group is also possible.

On the other hand, according to the D2D communication, it is possible to perform not only direct communication between the wireless terminals that use a radio resource which is managed or controlled by the wireless base station, but also the direction communication between the wireless terminals that does not use the radio resource which is managed or controlled by the wireless base station. Furthermore, many radio resources are relatively desired in order to use a modulation coding scheme (MCS) that is more resistant to an error in a case where the wireless terminal is positioned at the boundary of a cell, but a case where this problem is alleviated by applying the inter-terminal communication is also assumed. Because of this, the D2D communication also receives a lot of attention from the perspective of efficient usage of the radio resource, suppression of a processing load on the wireless base station, or the like.

The discussion on the D2D communication has just started in the 3GPP, and feasibility of the D2D communication, technologies that are desired to realize the D2D communication, performance and the like that are expected have been discussed so far. Furthermore, proximity services (ProSe) have been discussed that are broad concepts for the D2D communication or a service or application that is involved in the D2D communication. Because it is thought that the D2D communication is a technology that has applications in many fields, the D2D communication will expectedly continue to be actively discussed as a promising technology in the future in the 3GPP.

CITATION LIST

Non Patent Literature

NPL 1: "Feasibility study for Proximity Services (Prose)", 3GPP TR22.803, March 2013
NPL 2: "Study on LTE Device-to-Device Proximity Services", 3GPP RP-122009, December 2012

SUMMARY

According to an aspect of the invention, a wireless communication method includes transmitting first information from a second wireless terminal to a wireless base station, the first information relating to a first wireless quality from a first wireless terminal to the second wireless terminal, the first wireless quality being measured based on a first reference signal transmitted from the first wireless terminal, the wireless base station being configured to determine whether to perform device-to-device communication between the first wireless terminal and the second wireless terminal, and transmitting second information from the first wireless terminal to the wireless base station, the second information relating to a second wireless quality from the second wireless terminal to the first wireless terminal, the second wireless quality being measured based on a second reference signal transmitted from the second wireless terminal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
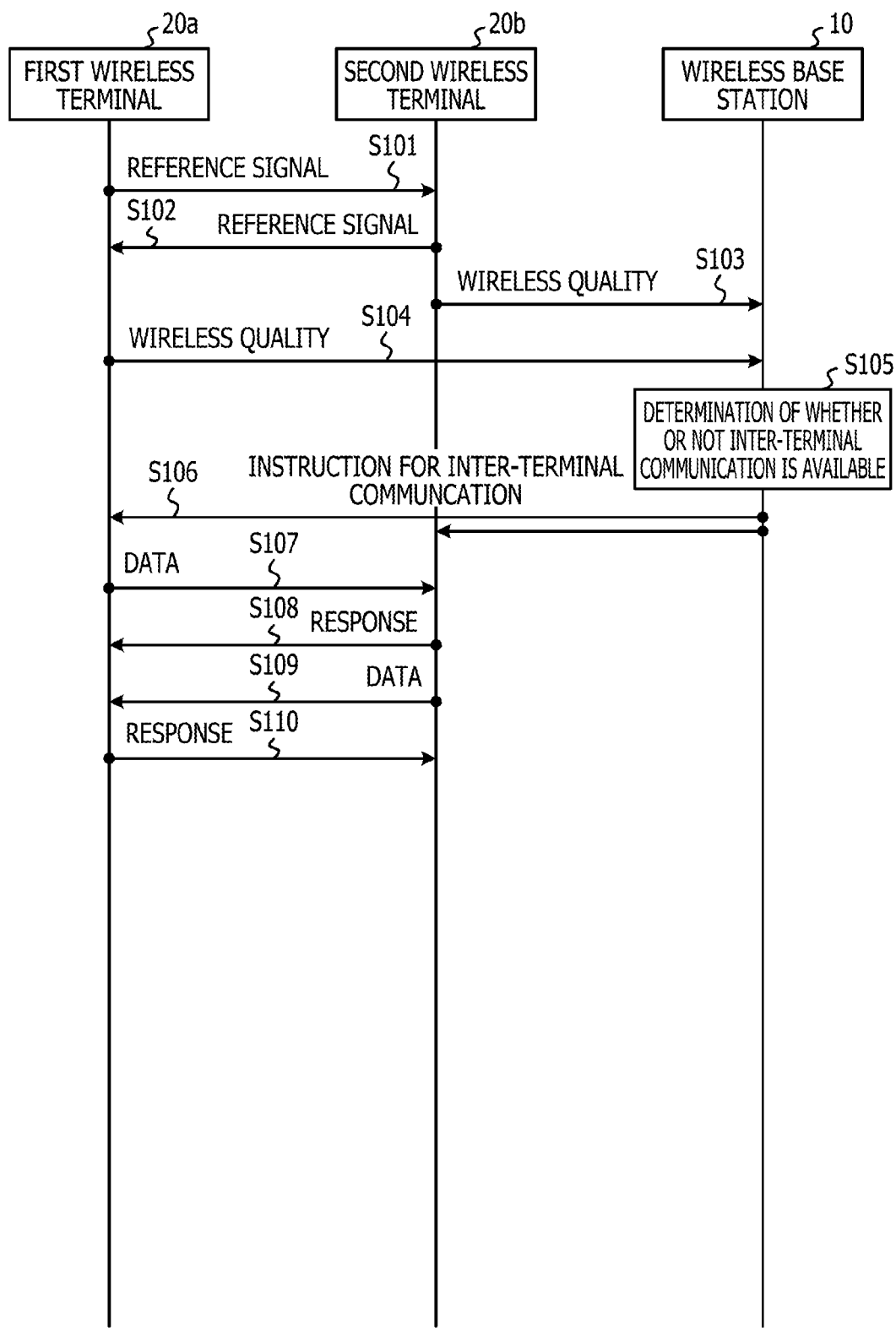
FIG. 1 is a diagram illustrating one example of a processing sequence according to a first embodiment of the present application.

As described above, the discussion on the D2D communication has just started in the 3GPP, and the D2D communication has not yet been discussed in great depth. Because of this, it is thought that, in a case where the D2D communication is performed on an LTE system, there is a likelihood that a certain problem or inconvenience that is not known to the world will occur. Particularly, a signal that is desired to realize the D2D communication between the wireless terminals or between the wireless terminal and the wireless base station has almost not been discussed so far. However, the signal that is desired to realize the D2D communication is not present in the related art.

Moreover, it is desirably noted that, as an example, the D2D communication in the LTE system is described above, but the present application is not limited to this. The present application can find many applications in the inter-terminal communication in a wireless communication system (a cellular system) other than the LTE system.

An object of a technology in the disclosure, which is contrived in view of the problems described above, is to provide a wireless communication method, a wireless communication system, a wireless base station, and a wireless terminal, in which a signal desired to realize inter-terminal communication is transmitted and received.

A wireless communication method, a wireless communication system, a wireless base station, and a wireless terminal according to embodiments, which are disclosed, will be described referring to the drawings. Moreover, for convenience, descriptions are provided according to individual embodiments, but it goes without saying that combinations of the embodiments can bring out combination effects and an increase in usefulness.

[Problem Identification]

First, problems with technologies in the related art are described before each embodiment is described. The problems were found as a result of the inventor's close examination of the technologies in the related art, and it is noted that the problems had not been known before that.

Now, in a wireless communication system (a cellular system), two wireless terminals are set to be present under the control (the management) of a certain wireless base system. At this time, in the related art, two wireless terminals perform communication through the wireless base station (for convenience, this communication type is hereinafter referred to as "communication through a wireless base station"). However, for example, in a case where a distance between each wireless terminal is short (in a case where a separate wireless terminal is present in proximity to a certain wireless terminal from the perspective that the wireless terminals are available within the reach of a wave, it is thought that the wireless terminals are positioned closely to each other), and the like, it is thought that inter-terminal communication in which wireless terminals perform direct wireless communication without the wireless base station being involved is also possible in principle.

However, the inter-terminal communication has not been studied in the wireless communication system (the cellular system), such as an LTE system, in the related art. Problems with inter-terminal communication are as follows. The problems were newly found as a result of the detailed study by the inventor.

In the cellular system in which the above-described inter-terminal communication is also available, normally, the communication through a wireless base station is normally performed, but it is assumed that, in a case where a given condition is satisfied, inter-terminal communication is performed. At this point, as given conditions for performing the inter-terminal communication, various conditions are thought of. As one example, in a case where a load on the wireless base station is great, it is thought that, for the purpose of reducing the load on the wireless base station, the wireless base station causes one or several of the wireless terminals under its control to make a transition from the through-wireless-base communication to the communication through a wireless base station. Furthermore, in a case where a user gives an explicit instruction to the wireless terminal (in a case where a user performs a given operation on the wireless terminal), it is thought that the transition is made from the communication through a wireless base station to the inter-terminal communication.

At this point, as given conditions for performing the inter-terminal communication, various conditions are thought of, but it is thought that at least a condition, which relates to an inter-wireless-terminal wireless quality, has to be included. This is because it is thought that, in a case where the inter-wireless-terminal wireless quality (in other words, this may be expressed as a wireless state, a wireless environment, or the like) is remarkably poor, it is not realistic to perform the inter-terminal communication. Because of this, it is thought that although given conditions include, for example, other conditions such as a load on the wireless base station, this does not matter, and that an inter-terminal wireless quality is indispensable.

Nevertheless, the wireless communication system (the cellular system), such as the LTE system, in the related art is not designed from the perspective as described above. That is, the wireless base station and the inter-wireless-terminal wireless quality are considered, and based on this, a design is established in such a manner that control or optimization of the wireless communication between the wireless base station and the wireless terminal is performed. Because of this, it is difficult to autonomously determine whether or not the wireless communication system performs the communication through a wireless base station or performs the inter-terminal communication.

Each embodiment for solving the above-described problems will be described below.

First Embodiment

A first embodiment is a generic embodiment for solving the above-described problems. More specifically, according to the first embodiment, which relates to a wireless communication method, there is provided a wireless communication method including: causing a second wireless terminal to transmit first information relating to wireless quality of communication from a first wireless terminal to the second wireless terminal, which is measured based on a first reference signal that is transmitted by the first wireless terminal, to a wireless base station; causing the first wireless terminal to transmit second information relating to wireless quality of communication from the second wireless terminal to the first wireless terminal, which is measured based on a second reference signal that is transmitted by the second wireless terminal, to the wireless base station; and causing the wireless base station to determine whether or not to perform inter-terminal communication between the first wireless terminal and the second wireless terminal, based on the first information and the second information.

At this point, as the above-described wireless base station, a wireless base station is typically thought of, but different wireless communication devices that include a third wireless terminal and the like may be available. As one example, when the wireless base station does not function properly due to a disaster or the like, a case where the wireless terminal instead functions as the wireless base station is thought of. According to the present embodiment and each embodiment that will be described below, a case where the wireless base station is the wireless base station will be described, but it is desirably noted that no limitation to this is imposed.

FIG. 1 is a diagram illustrating one example of a processing sequence according to the first embodiment.

Preconditions for the first embodiment are described. Now, it is assumed that two wireless terminals 20, that is, a first wireless terminal 20a and a second wireless terminal 20b, are under the management (the control) of a wireless base station 10. Each of the first wireless terminal 20a and the second wireless terminal 20b does not have to be in communication, but is set to in a state of being synchronized to at least the wireless base station 10. At this point, being synchronized means a state where the wireless terminal 20 can receive a synchronization signal or a common control signal that is transmitted by the wireless base station 10 and can check details of the synchronization or of the common control signal. Moreover, it is desirably noted that in the present application, the first wireless terminal 20a and the second wireless terminal 20b are collectively simply referred to as the wireless terminal 20.

In S101, the first wireless terminal 20a transmits a reference signal. At this point, the reference signal is a signal that can be a reference for measurement of a wireless environment, and may be any known signal by which measurement of wireless quality (that will be described below) can be performed. For example, the reference signals can include a reference signal, a pilot signal, a synchronization, a random access signal, and the like. Furthermore, in a case where an uplink reference signal in the LTE system is used as the reference signal, it is also possible to use any new reference signal that is neither an established demodulation reference signal (DRS or DMRS) nor an established sounding reference signal (SRS).

Furthermore, it is also possible to use a downlink reference signal (a UE-specific demodulation reference signal) or a synchronization signal (a primary synchronization signal (PSS), or a secondary synchronization signal (SSS)) in the LTE system as the reference signal. In a case where the downlink reference signal or the synchronization is used, it is possible for the wireless terminal 20 to use to a certain extent a reception signal processing circuit that is used to receive a signal from the wireless base station 10. As a condition for this, in a case where a signal that is used for downlink is transmitted to the wireless terminal 20, interference, which occurs between this signal and a signal that is transmitted by the wireless base station 10, has to be avoided or alleviated.

Additionally, it is also possible to use a signal on a physical uplink shared channel (PUSCH) that is an uplink data channel, as the reference signal. In a case where the reference signal or the like that is described above is used as the reference signal, only information that is at most an wireless-terminal identifier at the transmitting side is carried, but when the PUSCH is used, there is an advantage that many pieces of information can be included. As a condition for this, in a case where the reference signal or the like that is described above is used as the reference signal, detection of a sequence of signals (a sequence of codes) has to be performed at the receiving side, but in a case where the PUSCH is used, decoding has to be performed on the receiving side. Furthermore, in a case where the reference signal or the like is used as the reference signal, non-synchronization between terminals may be possible, but in a case where the PUSCH is used, synchronization between the terminals is basically desired. As the reference signal, it is also possible to employ a two-stage configuration that results from combining the reference signal or the like that is described above and the PUSCH.

At this point, the wireless base station 10 or the like notifies the first wireless terminal 20a and the second wireless terminal 20b of various parameters, such as a pattern (a signal sequence or a code sequence) of the reference signal and a radio resource (a timing or a frequency) on which the reference signal is transmitted, a transmission power of the reference signal, or so forth, and thus the first wireless terminal 20a and the second wireless terminal 20b is set to know these various parameters. For example, in the LTE system, this notification can be given with a radio resource control (RRC) signal that is a layer 3 control signal which is transmitted using a physical downlink shared channel (PDSCH) or with a layer 1 control signal that uses a physical downlink control channel (PDCCH), or an enhanced physical downlink control channel (EPDCCH).

In S101, the second wireless terminal 20b receives the reference signal that is transmitted by the first wireless terminal 20a.

At this time, the second wireless terminal 20b measures the wireless quality based on the reference signal that is transmitted by the first wireless terminal 20a. Unless otherwise specified, the wireless quality in the present application is defined as conceptually including quality of or a state of the received wireless signal (the reference signal), a non-inference state, or quality of or a state of a wireless channel on which the wireless signal (the reference signal) is transmitted. As specific examples of the wireless quality, a channel loss (a path loss) or wireless performance (channel performance), a reception power of the reference signal, a ratio of interference signal reception power to a desired signal reception power for the reference signal, and the like are given. The wireless quality in the present application is set in such a manner that the wireless quality can conceptually include something other than these within a range not departing from the purpose described above.

Moreover, although the wireless quality can not only be actually measured based on the received wireless signal (the reference signal), but can also be calculated from an actual measurement value based on the received wireless signal, this does not matter. For example, the path loss described above is a physical quantity that can be calculated from an actual measurement value of a reception power of the received wireless signal, transmission power that is separately acquired by an advance notification or the like, or the like.

In S102, the second wireless terminal 20b transmits the reference signal. Because the transmission of the reference signal by the second wireless terminal 20b in S102 has to be performed in the same manner as the transmission of the reference signal by the first wireless terminal 20a in S101, a description thereof is omitted. The first wireless terminal 20a and the second wireless terminal 20b may transmit the reference signals that use mutually different patterns.

In S102, the first wireless terminal 20a receives the reference signal that is transmitted by the second wireless terminal 20b. Because the reception of the reference signal by the first wireless terminal 20a in S102 has to be performed in the same manner as the reception of the reference signal by the second wireless terminal 20b in S101, a description thereof is omitted.

Next, in S103, the second wireless terminal 20b reports the wireless quality (a result of the measurement) that is measured in S101, to the wireless base station 10. For example, in the LTE system, the reporting in S103 can be performed with the RRC signal that uses the physical uplink shared channel (PUSCH) which is a physical data channel that is used in an uplink wireless section. Alternatively, the measured wireless quality (the result of the measurement) may be reported to the wireless base station 10 using a physical uplink control channel (PUCCH) that is in the uplink wireless section. Furthermore, the result of the measurement may be reported using the PUSCH directly, without being included in the RRC signal.

Furthermore, in S104, the first wireless terminal 20a reports the wireless quality (the result of the measurement) that is measured in S102, to the wireless base station 10. The reporting in S104 can also be performed with the same method as the reporting in S103, which is described above.

Next, in S105, based on the report that is received from the second wireless terminal 20b in S103 and the report that is received from the first wireless terminal 20a in S104, the wireless base station 10 determines whether or not the inter-terminal communication is performed between the first wireless terminal 20a and the second wireless terminal 20b. At this point, in S103, the report that is received by the wireless base station 10 from the second wireless terminal 20b includes wireless quality of communication from the first wireless terminal 20a to the second wireless terminal 20b. Furthermore, in S104, the report that is received by the wireless base station 10 from the first wireless terminal 20a includes wireless quality of communication from the second wireless terminal 20b to the first wireless terminal 20a. In S105, it is possible for the wireless base station 10 to determine whether or not the inter-terminal communication is performed between the first wireless terminal 20a and the second wireless terminal 20b based on the two wireless qualities.

The wireless base station 10 is set in such a manner that the wireless base station may perform the determination in S105 using an arbitrary method, based on the wireless quality that is received in each of S103 and S104. That is, the wireless base station 10 can perform the determination in S105, based on an arbitrary determination criterion, a rule, an algorithm, or the like. As one example, in a case where each of the wireless quality of the communication from the first wireless terminal 20a to the second wireless terminal 20b, and the wireless quality of the communication from the first wireless terminal 20a to the second wireless terminal 20b satisfies a given criterion, the wireless base station 10 can determine that the inter-terminal communication is performed between the first wireless terminal 20a and the second wireless terminal 20b. On the other hand, in a case where any one of the wireless quality of the communication from the first wireless terminal 20a to the second wireless terminal 20b, and the wireless quality of the communication from the first wireless terminal 20a to the second wireless terminal 20b does not satisfy the given criterion, the wireless base station 10 can determine that the inter-terminal communication is not performed between the first wireless terminal 20a and the second wireless terminal 20b.

As one example of the wireless quality that is used for the determination in S105, as described above, the channel quality (the path loss) or the wireless performance (the channel performance) is present in the wireless section between the first wireless terminal 20a and the second wireless terminal 20b. Based on the path loss, it can be inferred whether or not two wireless terminals 20 are positioned closely to each other. Additionally, it is also possible to determine whether or not the inter-terminal communication is performed, based on the channel performance.

Next, in S106, based on the determination that is performed in S105, the wireless base station 10 transmits an instruction to perform inter-terminal transmission between the first wireless terminal 20a and the second wireless terminal 20b. The instruction in S106 can also be performed with, for example, the RRC signal. On this occasion, an identifier (ID) that is recognized only between the first wireless terminal 20a and the second wireless terminal 20b, and the wireless base station 10 may be included in the RRC signal. The ID may be called, for example, a D2D-radio network temporary identifier (RNTI). The ID may be associated with a control signal that is transmitted in the communication between the first wireless terminal 20a and the second wireless terminal 20b, the communication between the first wireless terminal 20a and the wireless base station 10, and the communication between the second wireless terminal 20b and the wireless base station 10. Furthermore, it is also thought that the instruction in S106 is performed with the downlink control information (DCI) that is downlink control information, through a downlink control channel (physical downlink control channel (PDCCH)).

In S106, each of the first wireless terminal 20a and the second wireless terminal 20b receives the instruction to perform the inter-terminal communication between the first wireless terminal 20a and the second wireless terminal 20b. Accordingly, in S106 or later, it is possible for the first wireless terminal 20a and the second wireless terminal 20b to perform the inter-terminal communication, not to perform communication through the wireless base station 10. That is, in S106 or later, in a case where the first wireless terminal 20a and the second wireless terminal 20b perform the communication, transmission and reception of a wireless signal between terminals can be performed without the wireless base station 10 being involved. As one example in FIG. 1, in S107, a data signal is transmitted from the first wireless terminal 20a to the second wireless terminal 20b, and in S108, a response signal (for example, an ACK signal) is transmitted from the second wireless terminal 20b to the first wireless terminal 20a. Furthermore, in S109, the data signal is transmitted from the second wireless terminal 20b to the first wireless terminal 20a, and in S110, the response signal is transmitted from the first wireless terminal 20a to the second wireless terminal 20b.

At this point, in S106 or later, the inter-terminal communication is possible between the first wireless terminal 20a and the second wireless terminal 20b, but it is desirably noted that, although each wireless terminal 20 performs the communication with the wireless base station 10 during the inter-terminal communication, this does not matter. Particularly, it is highly desirable that the first wireless terminal 20a and the second wireless terminal 20b receive the synchronization signal that is periodically transmitted by the wireless base station 10, periodically or aperiodically, with the same period as or the longer period than a transmission period of the synchronization signal, and thus the synchronization to the wireless base station 10 is maintained. Furthermore, for example, the wireless base station 10 may transmit a control signal to the first wireless terminal 20a and the second wireless terminal 20b for the purpose of controlling an amount of occurring interference due to the inter-terminal communication. Additionally, the first wireless terminal 20a and the second wireless terminal 20b may transmit the wireless quality (the result of the measurement) to the wireless base station 10 periodically, when an instruction to do so is given by the wireless base station 10, or when a condition that is determined in advance is satisfied. Accordingly, the wireless base station 10 can know the inter-wireless-terminal wireless quality (the quality of the communication between the terminals) in a timely manner, and it is possible to suitably manage or control the communication between the terminals.

Moreover, in the present application, a scheme of the communication between the terminals or the like does not matter. For example, for a radio resource that is to be used for the inter-terminal communication, a radio resource that is determined in advance may be used, and a radio resource that is used for the inter-terminal communication in the instruction for the inter-terminal communication in S106 may be set to be designated.

Furthermore, the inter-terminal communication may be performed using any of a synchronous communication scheme and an asynchronous communication scheme. In a case where the inter-terminal communication is performed in the synchronous communication scheme, because processing is performed that establishes the synchronization between the terminals in S106 or later, the inter-terminal communication can start. In this case, information desired for the synchronization to be established between the terminals (desired to establish a radio link) may be set to be notified with the signal in S106. Furthermore, in a case where the inter-terminal communication is synchronous communication, a radio resource may be allocated dynamically each time the communication is performed, and the radio resource may be allocated intermittently in advance.

Moreover, in a case where the first wireless terminal 20a and the second wireless terminal 20b concurrently maintain the synchronization to the wireless base station 10, it is comparatively easy to maintain the synchronization between the first wireless terminal 20a and the second wireless terminal 20b. For the maintenance of the synchronization between the wireless terminals that communicate directly with each other, it is possible to use a value of a timing advance command (TA), as is, or to some extent, which is transmitted by the wireless base station 10 to the wireless terminal 20 in order to adjust a transmission timing at which the wireless terminal 20 transmits a wireless signal to the wireless base station 10. To what extent the TA command can be used depends on, for example, mutual positional relationships between the wireless terminals 20 and between the wireless terminal 20 and the wireless base station 10.

On the other hand, in a case where the inter-terminal communication is asynchronous communication, before a signal in which data is included is transmitted, it is also possible to transmit a signal that plays a synchronization signal role of making it easy to receive that signal, immediately before that.

A timing at which the inter-terminal communication ends can be determined arbitrarily. For example, processing operations that are equivalent to S101 to S105 in FIG. 1 are also performed periodically while the inter-terminal communication is in progress. Furthermore, in a case where the wireless quality does not satisfy a given criterion, and so forth, a determination that the wireless base station 10 ends the inter-terminal communication is made and the wireless terminal 20 can be notified to that effect. As a condition for this, in this case, although S103 and S104 are performed only in a case where the result of the measurement does not satisfy a criterion value, this does not matter. A result of wireless measurement of a reference signal that is transmitted for the purpose of demodulating at the receiving side a wireless signal that is transmitted between the first wireless terminal 20a and the second wireless terminal 20b may be reported to the wireless base station 10, periodically or when a given criterion is not met. After the inter-terminal communication ends, in a case where the first wireless terminal 20a and the second wireless terminal 20b communicate with each other, the communication through the wireless base station 10 is performed.

According to the first embodiment described above, based on the result of measuring the inter-terminal wireless quality, it is possible for the wireless base station 10 to autonomously determine whether or not to perform the inter-terminal communication. Therefore, according to the first embodiment, a remarkable effect can be achieved that was not obtained in the LTE system in the related art or other wireless communication systems.

Second Embodiment

A second embodiment is one embodiment that is equivalent to a specific aspect of the first embodiment. According to the second embodiment, which results from specifying the first embodiment in accordance with the LTE system, the sounding reference signal (SRS) that is a prescribed uplink reference signal in the LTE system is used as the reference signal according to the first embodiment. According to the present embodiment, it is desirably noted that the SRS is simply referred to as the reference signal.

Because the second embodiment is equivalent to a specific aspect of the first embodiment, what distinguishes the second embodiment from the first embodiment will be described in detail below in a concentrated manner. According to the second embodiment, it is desirably noted that a description which overlaps the description according to the first embodiment is suitably omitted.

First, the SRS that is the reference signal according to the present embodiment is described. As the prescribed uplink reference signal in the LTE system, in addition to the SRS, the demodulation reference signal (DRS or DMRS) is present. These differ in intended purpose. Because the DRS is a reference signal for demodulation, the DRS is transmitted on only a resource block (a subcarrier) to which uplink data is mapped in a subframe on which the uplink data is transmitted. In contrast, because the SRS is a reference signal for scheduling, in addition to being transmitted within the same subframe as the uplink data to transmit, the SRS is transmitted, periodically or is transmitted singly when an instruction to do so is given by the wireless base station, although the uplink data is not present. Furthermore, the SRS is transmitted, on all system areas (carriers), or on one or several regions within a system band, from each wireless terminal.

According to the present embodiment, because it is convenient to determine rather periodically whether or not the inter-terminal communication is available, and so forth, the inter-terminal wireless quality is measured based on the SRS. However, it is desirably noted that, although the DRS is used, the present embodiment can be performed in the same manner.

Figure 2:
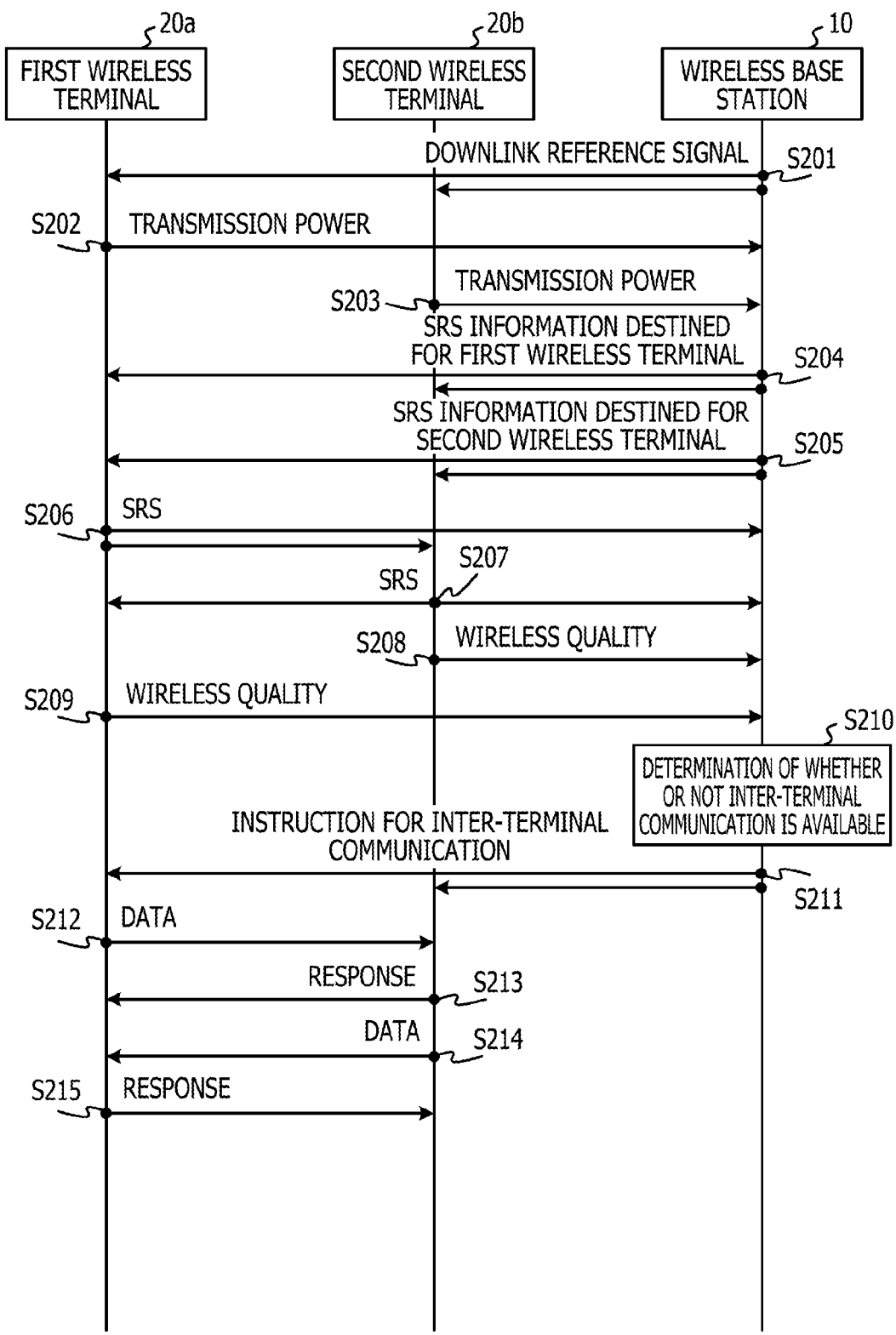
FIG. 2 is a diagram illustrating one example of a processing sequence according to a second embodiment of the present application.

FIG. 2 is a diagram illustrating one example of a processing sequence according to the second embodiment. Because preconditions for the second embodiment are equivalent to those according to the first embodiment, descriptions thereof are omitted here.

In S201 in FIG. 2, the wireless base station 10 transmits a downlink reference signal. The downlink reference signal is prescribed in the LTE system. Furthermore, in S201, the first wireless terminal 20a and the second wireless terminal 20b receive the downlink reference signal.

The downlink reference signal is also used for modulation of a downlink subframe or measurement of wireless quality, but is used here for determination of a transmission power of the wireless terminal 20. The transmission power of the wireless terminal 20 in the LTE system is determined by an open loop scheme and a closed loop scheme, but in S201, the transmission power is determined by the closed loop scheme. An outline of the determination of the transmission power of the wireless terminal 20 by the closed loop scheme is described. First, the wireless terminal 20 receives broadcast information that includes information indicating a reference signal transmission power which is transmitted by the wireless base station 10, from the wireless base station 10 (not illustrated). In the LTE system, the broadcast information is one piece of information that is called a system information block (SIB), and is transmitted from the wireless base station 10, using the PDSCH. Next, in S201, the wireless terminal 20 actually measures a reception power of the downlink reference signal. Next, the wireless terminal 20 calculates a path loss on a link from the wireless base station 10 to the wireless terminal 20, from the transmission power that is indicated by the broadcast information and from the actually-measured reception power. Then, based on the path loss, the wireless terminal 20 calculates the transmission power of the wireless terminal 20 according to a given rule. At this time, the greater the path loss, the greater value the transmission power of the wireless terminal 20 has.

In S201, the first wireless terminal 20a and the second wireless terminal 20b calculate the path losses between the first wireless terminal 20a and the wireless base station 10 and between the second wireless terminal 20b and the wireless base station 10, respectively, and then determine their respective transmission powers, using the closed loop scheme that is based on the downlink reference signal.

Next, in S202, the first wireless terminal 20a notifies the wireless base station 10 of a transmission power of the first wireless terminal 20a, which is determined in S201. The notification in S202 can be performed with, for example, the RRC signal.

The notification of the transmission power in S202 can be realized by a prescribed power headroom in the LTE system. The power headroom is a parameter indicating a difference between a requisite transmission power (which is calculated with a given calculation formula) of the wireless terminal 20 and a maximum transmission power that allows the wireless terminal 20 to perform the transmission. Furthermore, the notification in S202 may be realized by something other (for example, information indicating an absolute value of the transmission power of the wireless terminal 20) than this.

Furthermore, in S203, the second wireless terminal 20b notifies the wireless base station 10 of the transmission power of the second wireless terminal 20b, which is determined in S201. The notification in S203 can also be performed with, for example, the RRC signal.

Next, in S204 in FIG. 2, the wireless base station 10 transmits information relating to the reference signal (the SRS) that is transmitted by the first wireless terminal 20a. This information is referred to as reference signal information in the present application, and particularly as the SRS information according to the present embodiment. The reference signal information can be said to be information desired to transmit the reference signal at the reference signal transmitting side, and to be information desired to receive the reference signal at the reference signal receiving side.

The reference signal information can include various pieces of information (parameters) relating to the reference signal. For example, SRS information that is the reference signal information according to the present embodiment is a prescribed parameter that itself relates to the SRS in the LTE system, or can be defined as a parameter set including an established parameter.

The reference signal information (which is the SRS information according to the present embodiment, and this is hereinafter true), for example, includes information relating to a timing at which the reference signal (which is the SRS according to the present embodiment, and this is hereinafter true). For example, in a case where the reference signal is periodically transmitted, the information relating to the timing at which the reference signal is transmitted can be set to be an offset value (starting from a reference point in time) and a period (an interval). At this point, in a case where the reference signal is transmitted on a subframe basis, units for the offset value and the period can be set to be subframes.

Furthermore, pieces of reference signal information can include information relating to a type of a signal sequence of reference signals or a type of a code sequence, a transmission bandwidth in which the reference signal is transmitted, and information indicating a frequency position at which the reference signal is arranged. The reference signal information can include a cyclic shift for securing orthogonality of the reference signal between the terminals. The pieces of reference signal information can include all pieces of information for transmitting and receiving the reference signal, such as information on an antenna port through which the reference signal is transmitted, information on frequency hopping that is applied to the reference signal, and configuration information on the subframe on which the reference signal is transmitted.

At this point, the reference signal information according to the present embodiment is set to include information (which is referred to as transmission power information) indicating a transmission power (an absolute value) of the reference signal. According to the present embodiment, because the transmission power of the first wireless terminal 20a is reported to the wireless base station 10 in S202, it is possible for the wireless base station 10 to include the transmission power information in the reference signal information. More specifically, for example, in a case where the notification in S202 is realized with the power headroom, based on this and on a maximum transmission power of the wireless terminal 20, which is known in advance, the wireless base station 10 can obtain an absolute value of a transmission power of the wireless terminal.

With a broadcast signal (the broadcast information), some or all of the pieces of reference signal information can be transmitted from the wireless base station 10 to the wireless terminal 20. Furthermore, with the RRC signal as an individual control signal, some of all of the pieces of reference signal information can be transmitted from the wireless base station 10 to the wireless terminal 20. Moreover, pieces of broadcast signal, for example, include a master information block (MIB) that is transmitted on a broadcast channel (BCH) and a system information block (SIB) that is transmitted with the RRC signal in the physical downlink shared channel (PDSCH).

In S204, the first wireless terminal 20a receives the reference signal information (for convenience, this is referred to as the "reference signal information destined for the first wireless terminal 20a" in the present application, and is referred to particularly as the "SRS information destined from the first wireless terminal 20a" according to the present embodiment) relating to the reference signal that is transmitted by the first wireless terminal 20a from the wireless base station 10. Furthermore, in S204, the second wireless terminal 20b also receives the reference information destined for the first wireless terminal 20a, from the wireless base station 10.

Moreover, in a case where some or all of pieces of reference information destined for the first wireless terminal 20a are transmitted with the RRC signal as the individual signal from the wireless base station 10, an identifier (a radio network temporary identifier (RNTI)) of the first wireless terminal 20a is desired in order to receive the RRC signal. Because of this, it is desirably noted that the second wireless terminal 20b desires some contrivance in order to receive the reference information destined for the first wireless terminal 20a. For example, it is thought that the second wireless terminal 20b is informed, in advance, of the identifier of the first wireless terminal 20a, or that a common identifier is used in the first wireless terminal 20a and the second wireless terminal 20b. The common identifier may be called a D2D-RNTI. Furthermore, in S204, with individual RRC signals, the wireless base station 10 may transmit some or all of the pieces of reference information destined for the first wireless terminal 20a to each of the first wireless terminal 20a and the second wireless terminal 20b. In this case, in S204, the wireless base station 10 transmits two RRC signals.

Next, in S205, the wireless base station 10 transmits the reference signal information destined for the second wireless terminal 20b. In contrast, the second wireless terminal 20b receives the reference signal information destined for the second wireless terminal 20b from the wireless base station 10. Furthermore, the first wireless terminal 20a also receives the reference signal information destined for the second wireless terminal 20b from the wireless base station 10. Because S205 has to be performed in the same manner as S204, a detailed description thereof is omitted.

In S206 in FIG. 2, the first wireless terminal 20a transmits the reference signal (the SRS) based on the reference signal information destined for the first wireless terminal 20a, which is received in S204. For example, the first wireless terminal 20a transmits the reference signal based on information relating to the transmission timing that is included in the reference signal information (the SRS information) which is received in S204. For example, in a case where, in the reference signal information, the transmission timing is designated with the offset value and the period on the subframe basis, the first wireless terminal 20a transmits the reference signal periodically, on every subframe that corresponds to the period, starting from a subframe that corresponds to the offset value. The reference signal (the SRS) may not be transmitted periodically successively, and may be transmitted singly one time or as much as several times. In this case, the reference signal information indicates that such a transmission method is applied. As described above, the pieces of reference signal information include various pieces of information, but in S206, the first wireless terminal 20a transmits the reference signal based on these pieces of information.

According to the present embodiment, the SRS that is the reference signal that is transmitted by the wireless terminal 20 is the reference signal that the wireless terminal 20 originally intends to transmit toward the wireless base station 10 in the LTE system. Therefore, in S206, the wireless base station 10 receives the SRS that is transmitted by the first wireless terminal 20a. In addition to this, according to the present embodiment, in S206, the second wireless terminal 20b also receives the SRS that is transmitted by the first wireless terminal 20a. Because the SRS information for the first wireless terminal 20a is received in S204, the second wireless terminal 20b can receive the SRS that is transmitted by the first wireless terminal 20a, based on the SRS information, in S206.

At this time, the second wireless terminal 20b measures the wireless quality of the communication from the first wireless terminal 20a to the second wireless terminal 20b, based on the reference signal (the SRS) that is transmitted by the first wireless terminal 20a. The wireless quality in the present application is as described according to the first embodiment, and, unless otherwise specified, includes the quality or the state of the received wireless signal (the reference signal), or the quality or the state of the wireless channel on which the wireless signal (the reference signal) is transmitted. A description of the wireless quality, which overlaps the description according to the first embodiment, is omitted here.

As specific examples of the wireless quality, as described according to the first embodiment, the channel loss (the path loss) and the wireless performance (the channel performance) are given. As one example according to the present embodiment, the channel loss and the wireless performance are set to be used as the wireless quality. As a condition for this, instead of the channel loss, it is also possible to use a reference signal received power (RSRP) that is information which has some correlation with the channel loss, a received signal strength indicator (RSSI), a reference signal received quality (RSRQ), and the like. Furthermore, instead of the wireless performance, it is also possible to use a signal to noise power ratio (SNR) that is an indicator that is calculated based on the wireless performance, a signal to interference plus noise power ratio (SINR), a signal to noise and distortion power ratio (SNDR), and the like.

As one example according to the present embodiment, the path loss and the channel performance are used as the wireless quality. Accordingly, in S206, the second wireless terminal 20b calculates the path loss and calculates the channel performance based on the reference signal (the SRS) that is transmitted by the first wireless terminal 20a. At this point, in order to calculate the path loss, a transmission power and a reception power (any of which is an absolute value) of the downlink reference signal are desired, but the transmission power has to refer to the transmission power information that is included in the reference signal information which is received in S204, and the reception power has to use an actual value that is based on the reference signal. That is, because the second wireless terminal 20b according to the present embodiment knows the transmission power of the first wireless terminal 20a in advance, the path loss can be obtained based on the reference signal.

In this manner, according to the present embodiment, the wireless terminal 20 can calculate the path loss between the terminals. In contrast, it is difficult for the wireless terminal 20 to calculate the path loss between the terminals in a general LTE system. This is because, in the general LTE system, the wireless terminal 20 is not provided with a unit of knowing a transmission power (an absolute power) of the wireless terminal 20 that is the other party.

At this point, according to the present embodiment, in S202 and S203, each wireless terminal 20 transmits its transmission power (an absolute value) to the wireless base station 10. Then, in S204, and S205, the wireless base station 10 transmits the transmission power (the absolute value) of the wireless terminal 20 to the wireless terminal 20 that is the other party. Accordingly, according to the present embodiment, it is possible for the wireless terminal 20 to calculate the path loss between the terminals.

Next, in S207, the second wireless terminal 20b transmits the reference signal (the SRS) based on the reference signal information destined for the second wireless terminal 20b, which is received in S205. In contrast, in S207, the first wireless terminal 20a receives the reference signal that is transmitted by the second wireless terminal 20b. At this time, the first wireless terminal 20a measures the wireless quality of the communication from the second wireless terminal 20b to the first wireless terminal 20a, based on the reference signal that is transmitted by the second wireless terminal 20b. Because S207 has to be performed in the same manner as S206, a detailed description thereof is omitted.

Next, in S208, the second wireless terminal 20b reports (transmits) the wireless quality of the communication from the first wireless terminal 20a to the second wireless terminal 20b, which is measured in S206, to the wireless base station 10. The report in S208, for example, can be transmitted with the RRC signal that is transmitted using the PUSCH or with something that uses the PUSCH itself. The report in S206 may be set to be transmitted with an uplink control signal or a different signal. In contrast, in S208, the wireless base station 10 gets (receives) the report on the wireless quality of the communication from the first wireless terminal 20a to the second wireless terminal 20b from the second wireless terminal 20b.

Next, in S209, the first wireless terminal 20a reports (transmits) the wireless quality of the communication from the second wireless terminal 20b to the first wireless terminal 20a, which is measured in S207, to the wireless base station 10. In contrast, in S209, the wireless base station 10 gets (receives) the report on the wireless quality of the communication from the second wireless terminal 20b to the first wireless terminal 20a, from the first wireless terminal 20a. Because S209 has to be performed in the same manner as S208, a detailed description thereof is omitted.

Next, in S210, the wireless base station 10 determines whether or not inter-terminal communication is performed between the first wireless terminal 20a and the second wireless terminal 20b, based on the wireless quality of the communication from the first wireless terminal 20a to the second wireless terminal 20b, which is received from the second wireless terminal 20b in S208, and on the wireless quality of the communication from second wireless terminal 20b to the first wireless terminal 20a, which is received from the first wireless terminal 20a in S209.

The wireless base station 10 is set in such a manner that the wireless base station 10 may perform the determination in S210 using an arbitrary method, based on the wireless quality that is received in each of S208 and S209. That is, the wireless base station 10 can perform the determination in S210, based on an arbitrary determination criterion, a rule, an algorithm, or the like.

One example of the determination method is illustrated in S210. As described above, according to the present embodiment, each of the wireless qualities that are reported in S208 and S209 includes the channel loss and the wireless performance. At this time, the wireless base station 10 first determines whether or not, in terms of the wireless quality of the communication from the first wireless terminal 20a to the second wireless terminal 20b, a condition that the channel loss is a given threshold or below (this condition is called a first condition) and a condition that the wireless performance in the resource block (the subcarrier) for the communication between the terminals, which is determined in advance, satisfies a given quality (this condition is called a second condition) are satisfied. Then, in a case where, in terms of the wireless quality of the communication from the first wireless terminal 20a to the second wireless terminal 20b, the first condition and the second condition are satisfied, the wireless base station 10 further determines whether or not the first condition and the second condition are satisfied in terms of the wireless quality of the communication from the second wireless terminal 20b to the first wireless terminal 20a. Then, in a case where, in terms of the wireless quality of the communication from the second wireless terminal 20b to the first wireless terminal 20a, the first condition and the second condition are also satisfied, the wireless base station 10 can determine that the inter-terminal communication is performed between the first wireless terminal 20a and the second wireless terminal 20b. On the other hand, otherwise, the wireless base station 10 can determine that the inter-terminal communication is not performed between the first wireless terminal 20a and the second wireless terminal 20b. At this point, the determination method that is described here is one example. It is desirably noted that, as described above, the wireless base station 10 can perform the determination in S210 using an arbitrary method, based on the wireless quality that is received in each of S208 and S209.

Next, in S211, the wireless base station 10 notifies the first wireless terminal 20a and the second wireless terminal 20b of a result of the determination in S210 (transmits a result of the determination in S210 to the first wireless terminal 20a and the second wireless terminal 20b). That is, in S211, the wireless base station 10 notifies the first wireless terminal 20a and the second wireless terminal 20b whether or not the inter-terminal communication is performed between the first wireless terminal 20a and the second wireless terminal 20b. The notification in S211 can be transmitted with, for example, the RRC signal. The notification in S211 may be set to be transmitted with DCI or a different signal. In contrast, in S211, the first wireless terminal 20a and the second wireless terminal 20b get (receive) the notification of the result of the determination in S210 by the wireless base station 10 from the wireless base station 10.

Moreover, it is noted that, when two wireless terminals 20 receives the notification in S211, the same contrivance as when the two wireless terminals 20 receive the reference signal information in S204 is desired.

In S211, each of the first wireless terminal 20*a* and the second wireless terminal 20*b* receives an instruction to perform the inter-terminal communication. Accordingly, in S211 or later, it is possible for the first wireless terminal 20*a* and the second wireless terminal 20*b* to perform the inter-terminal communication not to perform the communication through the wireless base station 10. That is, in S211 or later, in the case where the first wireless terminal 20*a* and the second wireless terminal 20*b* perform the communication, transmission and reception of a wireless signal between terminals can be performed without the wireless base station 10 being involved. As one example in FIG. 1, in S212, the data signal is transmitted from the first wireless terminal 20*a* to the second wireless terminal 20*b*, and in S213, the response signal (for example, the ACK signal) is transmitted from the second wireless terminal 20*b* to the first wireless terminal 20*a*. Furthermore, S214, the data signal is transmitted from the second wireless terminal 20*b* to the first wireless terminal 20*a*, and in S215, the response signal is transmitted from the first wireless terminal 20*a* to the second wireless terminal 20*b*.

Because S212 to S215 in FIG. 2 have to be performed in the same manner as S107 to S110 in FIG. 1, according to the first embodiment, descriptions thereof are omitted here.

At this point, in S211 or later, the inter-terminal communication is possible between the first wireless terminal 20*a* and the second wireless terminal 20*b*, but it is desirably noted that, although each wireless terminal 20 performs the communication with the wireless base station 10 during the inter-terminal communication, this does not matter. This is true for the first embodiment. Particularly, it is highly desirable that the first wireless terminal 20*a* and the second wireless terminal 20*b* receives the synchronization signal that is periodically transmitted by the wireless base station 10, periodically or aperiodically, with the same period as or the longer period than the transmission period of the synchronization signal, and thus the synchronization to the wireless base station 10 is maintained. Furthermore, for example, the wireless base station 10 may transmit a control signal to the first wireless terminal 20*a* and the second wireless terminal 20*b* for the purpose of controlling an amount of occurring interference due to the inter-terminal communication. Additionally, the first wireless terminal 20*a* and the second wireless terminal 20*b* may transmit the wireless quality (the result of the measurement) to the wireless base station 10 periodically, when an instruction to do so is given by the wireless base station 10, or when a condition that is determined in advance is satisfied. Accordingly, the wireless base station 10 can know the inter-wireless-terminal wireless quality (the quality of the communication between the terminals) in a timely manner, and it is possible to suitably manage or control the communication between the terminals.

According to the second embodiment described above, as is the case with the first embodiment, based on the result of measuring the inter-terminal wireless quality, the wireless base station 10 can autonomously determine whether or not to perform the inter-terminal communication. Therefore, according to the second embodiment, the remarkable effect can be achieved that was not obtained in the LTE system in the related art or other wireless communication systems.

Furthermore, according to the second embodiment, the SRS that is prescribed in the existing LTE system is used, and the reference signal for the inter-terminal communication is not newly introduced. Because of this, it is desirably noted that, while a change to the existing LTE system is kept to the minimum, there is an advantage of obtaining the effect described above.

Third Embodiment

A third embodiment is one embodiment that is equivalent to a specific aspect of the first embodiment, as is the case with the second embodiment. According to the second embodiment, which results from specifying the first embodiment in accordance with the LTE system, the SRS that is the prescribed uplink reference signal in the LTE system is used as the reference signal. In contrast, according to the third embodiment is an embodiment that results from specifying the first embodiment in accordance with the LTE system, a reference signal between the terminals that is not prescribed in the LTE system is introduced as the reference signal.

Because the third embodiment has many things in common with the second embodiment, what distinguishes the third embodiment from the second embodiment will be described in detail below in a concentrated manner. According to the third embodiment, it is desirably noted that a description which overlaps the description according to the second embodiment is suitably omitted. Furthermore, in a case where the description according to the second embodiment is referred to in order to supplement description according to the third embodiment, it is desirably noted that the term "inter-terminal reference signal" is used instead of the term "SRS" according to the second embodiment.

First, the significance of the present embodiment is described. According to the second embodiment, the SRS that is the prescribed uplink reference signal in the LTE system is used as the reference signal for measuring the inter-terminal wireless quality. At this point, as described according to the second embodiment, a transmission power of the SRS is determined based on the path loss on the link from the wireless base station 10 to the wireless terminal 20. This is because the SRS is the reference signal that is originally transmitted from the wireless terminal 20 toward the wireless base station 10 and thus the transmission power at which the reference signal is likely to reach up to the wireless base station 10, is desired.

Therefore, the greater path loss the wireless terminal 20 has, the greater the transmission power of the SRS is. Typically, the farther the wireless terminal 20 (the wireless terminal 20 that is positioned at the boundary of a cell) is away from the wireless base station 10, the greater the transmission power of the SRS is. Of course, the transmission power of the SRS varies from one wireless terminal 20 to another wireless terminal 20.

Incidentally, it is thought that the transmission power of the reference signal (which is referred to as the inter-terminal reference signal in the present application) that is supplied as the reference signal for measuring the inter-terminal wireless quality desirably satisfies the following three requirements.

First, as a first requirement, a requirement that the transmission power of the inter-terminal reference signal is equal among the terminals is given. When the transmission power of the inter-terminal reference signal differs among the terminals, it is thought that an evaluation of the wireless performance is not fair in terms of two opposite directions. This is because in the wireless terminal 20 of which the other party has a small transmission power, a decrease in the transmission power makes it easy for an interference wave to exert influence. Then, when the evaluation of the wireless performance lacks fairness, it is not preferable that this also exerts an influence on the validity of the result of determining whether or the inter-terminal communication is available. Therefore, it is thought that the transmission power of the inter-terminal reference signal is desirably equal among the terminals.

Next, as a second requirement, a requirement that the farther the wireless terminal 20 is away from the wireless base station 10, the smaller the transmission power of the inter-terminal reference signal is, is given. This is because, when the wireless terminal 20 (the wireless terminal 20 is positioned at the boundary of a cell) that is remote from the wireless base station 10 transmits a signal at a high transmission power, a source of interference with a different wireless base station 10b in the neighborhood is easily produced.

Additionally, a third requirement, a requirement that the transmission power of the inter-terminal reference signal is determined depending on a distance between the terminals is given. This is because, when there is little change in the reception power of the inter-terminal reference signal, the evaluation of the wireless quality is suitably performed.

As described above, it is thought that the inter-terminal reference signal desirably satisfies these three requirements. However, the SRS that is the reference signal according to the second embodiment does not satisfy any of the three requirements. First, as described above, because the transmission power of the SRS varies among the wireless terminals 20, the first requirement is not satisfied. Furthermore, because, rather, the transmission power of the wireless terminal 20 that is remote from the wireless base station 10 is great for the SRS, the second requirement is also not satisfied. Additionally, because for the SRS, the distance between the terminals and the like are not considered, the third requirement is also not satisfied.

Therefore, it is thought that, in a case where the measurement of the inter-terminal wireless quality is performed, one method to do this is to introduce the inter-terminal reference signal that is likely to satisfy the three requirements described above rather than to use the prescribed SRS in the LTE system without any change for the unintended purpose.

At this point, it is desirably noted that, as the introduced inter-terminal reference signal according to the present embodiment, the SRS may be used in a limited manner for the unintended purpose. As one example, it is thought that the SRS is used for the signal sequence (the code sequence) and separate provisions are established for the transmission timing or the frequency position. Furthermore, it is desirable that in such a case, particularly, separate provisions are established for the transmission power. In the general LTE system, the transmission power of the SRS is associated with a transmission power of the PDSCH, and the wireless base station 10 notifies the wireless terminal 20 of a difference between the transmission power of the PUSCH and the transmission power of the SRS. However, in a case where the SRS is used as the inter-terminal reference signal, it is preferable that the transmission power of the SRS is not associated with the transmission power of the PDSCH. This is because the transmission power of the PUSCH depends on a distance between the wireless terminal 20 and the wireless base station 10. Accordingly, in a case where the transmission power of the SRS is used as the inter-terminal reference signal, it is desirable that the transmission power is adjusted. This can be realized by the wireless base station 10 notifying the wireless terminal 20 of information (for example, information indicating an absolute value of the transmission power of the SRS) for suitably adjusting the transmission power of the SRS (this notification corresponds to the transmission power information in the reference signal information described above).

Moreover, it is noted that the three requirements described above are not indispensable for the inter-terminal reference signal. It is thought that, desirably, at least one or more among the three requirements are satisfied and that, more desirably, many of the requirements are satisfied, but it is desirably thought that even if the signal does not satisfy these requirements, the signal can be used as the inter-terminal reference signal.

The third embodiment is one example of the embodiment, according to which the inter-terminal reference signal is used as the reference signal.

Figure 3:
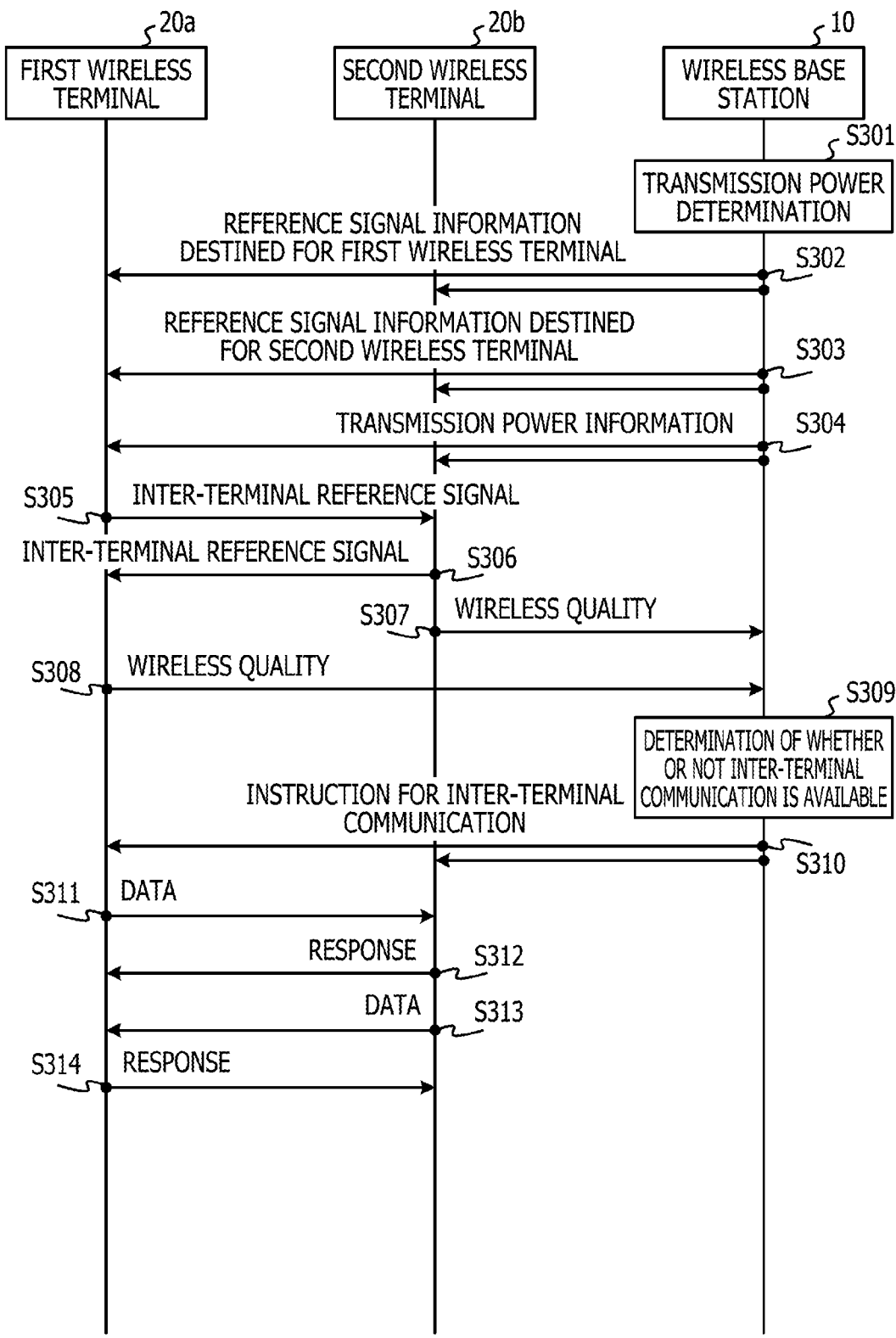
FIG. 3 is a diagram illustrating one example of a processing sequence according to a third embodiment of the present application.

FIG. 3 is a diagram illustrating one example of a processing sequence according to the third embodiment. Because preconditions for the third embodiment are equivalent to those according to the first embodiment, descriptions thereof are omitted here.

In S301 in FIG. 3, the wireless base station 10 determines the transmission power that is available when the first wireless terminal 20a and the second wireless terminal 20b transmit the inter-terminal reference signal. According to the present embodiment, the first wireless terminal 20a and the second wireless terminal 20b are set to transmit the inter-terminal reference signal at the same transmission power in view of the first requirement. That is, in S301, the transmission power that is determined by the wireless base station 10 is in common between the first wireless terminal 20a and the second wireless terminal 20b.

The transmission power of the wireless terminal 20 by the wireless base station 10 in S301 is set to be determined in such a manner that the transmission power of the wireless terminal 20 may be determined with an arbitrary method. That is, the wireless base station 10 can determine the transmission power in S301 based on an arbitrary determination criterion, a rule, an algorithm, or the like. Moreover, the transmission power in S301 is set to be determined not only when the transmission power has to be determined each time a particular thing occurs according to a situation, but also when the transmission power is determined in advance (the determination is targeted at a given value).

One example of the transmission power determination method in S301 is described. It is thought that, as the simplest example, the transmission power is set to be a given value. It is thought that, as one example, a given value is determined in advance depending on a size of a cell that the wireless base station 10 has. Furthermore, the wireless base station 10 may be set to determine a given value for the transmission power of the wireless terminal 20 based on information that is received in advance from the wireless terminal 20, information that is received from the different wireless base station 10b, or the like.

Next, in S302 in FIG. 3, the wireless base station 10 transmits the reference signal information destined for the first wireless terminal 20a. In contrast, in S302, the first wireless terminal 20a receives the reference signal information destined for the first wireless terminal 20a from the wireless base station 10. Additionally, in S302, the second wireless terminal 20b also receives the reference signal information destined for the first wireless terminal 20a from the wireless base station 10.

S302 can be performed in accordance with S204 in FIG. 2 according to the second embodiment. However, what distinguishes reference signal information destined for the first wireless terminal 20a in S302, in some respects, from the reference information destined for the first wireless terminal 20a in S204 will be described.

The transmission power information that is information indicating the transmission power of the reference signal which is transmitted by the first wireless terminal 20a is included in the reference information destined for the first wireless terminal 20a in S204 according to the second embodiment. However, the transmission power information (information indicating the transmission power that is determined in S301) is set not to be included in the reference information destined for the first wireless terminal 20a in S302 according to the present embodiment. Moreover, according to the present embodiment, the transmission power information is transmitted to the first wireless terminal 20a in S304 that will be described below.

In S303 in FIG. 3, the wireless base station 10 transmits the reference signal information destined for the second wireless terminal 20b. In contrast, in S303, the second wireless terminal 20b receives the reference signal information destined for the second wireless terminal 20b from the wireless base station 10. Additionally, in S303, the first wireless terminal 20a also receives the reference signal information destined for the second wireless terminal 20b from the wireless base station 10. Because S303 has to be performed in the same manner as S302, a detailed description thereof is omitted.

Next, the wireless base station 10 in S304 in FIG. 3 transmits the transmission power information indicating the transmission power that is determined in S301. In contrast, both of the first wireless terminal 20a and the second wireless terminal 20b in S304 receives the transmission power information from the wireless base station 10. This is because the transmission power that is determined in S301 is in common between the first wireless terminal 20a and the second wireless terminal 20b.

The transmission power information in S304 can be transmitted with an arbitrary signal. For example, the transmission power information can be transmitted with the individual RRC signal described above. Furthermore, the transmission power information can be transmitted with the DCI described above. In addition, it is also possible to transmit the transmission power information with the broadcast information described above.

Moreover, in a case where the transmission power information in S304 is transmitted with the individual RRC signal or the DCI, because the pieces of transmission power information described above are received by two wireless terminals 20, it is noted that the contrivance as when the two wireless terminals 20 receives the reference signal information in S204 is desired.

Incidentally, in a case where, in S304, the wireless base station 10 transmits the transmission power information with the DCI, normally, the wireless base station 10 have difficulty in knowing whether or not the wireless terminal 20 succeeds in receiving the transmission power information. This is because the DCI does not accompany the response signal (the ACK signal or a NACK signal). This problem can be solved by allocating a small uplink radio resource for response signal transmission by the wireless terminal 20 in the DCI.

Next, in S305, the first wireless terminal 20a transmits the inter-terminal reference signal at the transmission power that is indicated by the transmission power information which is received in S304, based on the reference signal information destined for the first wireless terminal 20a, which is received in S302. In contrast, in S305, the second wireless terminal 20b receives the inter-terminal reference signal, based on the reference signal information destined for the first wireless terminal 20a, which is received in S302. At this time, the second wireless terminal 20b measures a path loss on a link from the first wireless terminal 20a to the second wireless terminal 20b, based on the transmission power that is indicated by the transmission power information which is receive in S304.

Because S305 has to be performed in the same manner as S206 in FIG. 2 according to the second embodiment, a description thereof is omitted here. As a condition for this, it is noted that the wireless base station 10 does not receive the inter-terminal reference signal in S304 according to the present embodiment, which is different from the SRS in S206 according to the second embodiment.

Next, in S306, the second wireless terminal 20b transmits the inter-terminal reference signal at the transmission power that is indicated by the transmission power information which is received in S304, based on the reference signal information destined for the second wireless terminal 20b, which is received in S303. In contrast, in S306, the first wireless terminal 20a receives the inter-terminal reference signal, based on the reference signal information destined for the second wireless terminal 20b, which is received in S303. At this time, the first wireless terminal 20a measures a path loss on a link from the second wireless terminal 20b to the first wireless terminal 20a, based on the transmission power that is indicated by the transmission power information which is receive in S304. Because S306 has to be performed in the same manner as S305, a description thereof is omitted here.

Because S307 to S314 in FIG. 3, which are subsequent processing operations in FIG. 3, has to be performed in the same manner as S208 to S215 in FIG. 2 according to the second embodiment, descriptions thereof are omitted here.

Moreover, as is the case with the processing sequence that is illustrated in FIG. 3, the reference information signal destined for the first wireless terminal 20a in S302, the reference signal information destined for the second wireless terminal 20b in S303 and the transmission power information in S304 are described as being different signals. However, it is noted that this is only one example of the third embodiment, and that the signals described above may be the same signals. For example, although S302 to S304 are transmitted and received with one signal, this does not matter. Furthermore, although S302 to S304 are transmitted and received with one signal and S303 to S304 are transmitted and received with a different one, this does not matter (in this case, each wireless terminal 20 is substantially two times notified of the transmission power information in S304). It is noted that these changes do not reduce any effect that is achieved according to the third embodiment.

According to the third embodiment described above, as is the case with the first and second embodiments, based on the result of measuring the inter-terminal wireless quality, the wireless base station 10 can autonomously determine whether or not to perform the inter-terminal communication. Therefore, according to the third embodiment, the remarkable effect can be achieved that was not obtained in the LTE system in the related art or other wireless communication systems.

Furthermore, it is noted that according to the third embodiment, the first requirement described above is satisfied by introducing the inter-terminal reference signal. Because of this, according to the third embodiment, an effect in which the transmission power of the inter-terminal reference signal is equal among the terminals is also achieved.

Fourth Embodiment

A fourth embodiment is one embodiment that is equivalent to the specific third embodiment. As is the case with the third embodiment, the fourth embodiment is also one example of the embodiment, according to which the inter-terminal reference signal is used as the reference signal. According to the fourth embodiment, the wireless base station 10 determines the transmission power of the wireless terminal 20, considering an influence of interference on the different wireless base station 10b and the like.

Because the fourth embodiment has many things in common with the third embodiment, what distinguishes the fourth embodiment from the third embodiment will be described in detail below in a concentrated manner. According to the fourth embodiment, it is desirably noted that a description which overlaps the description according to the third embodiment is suitably omitted.

Figure 4:
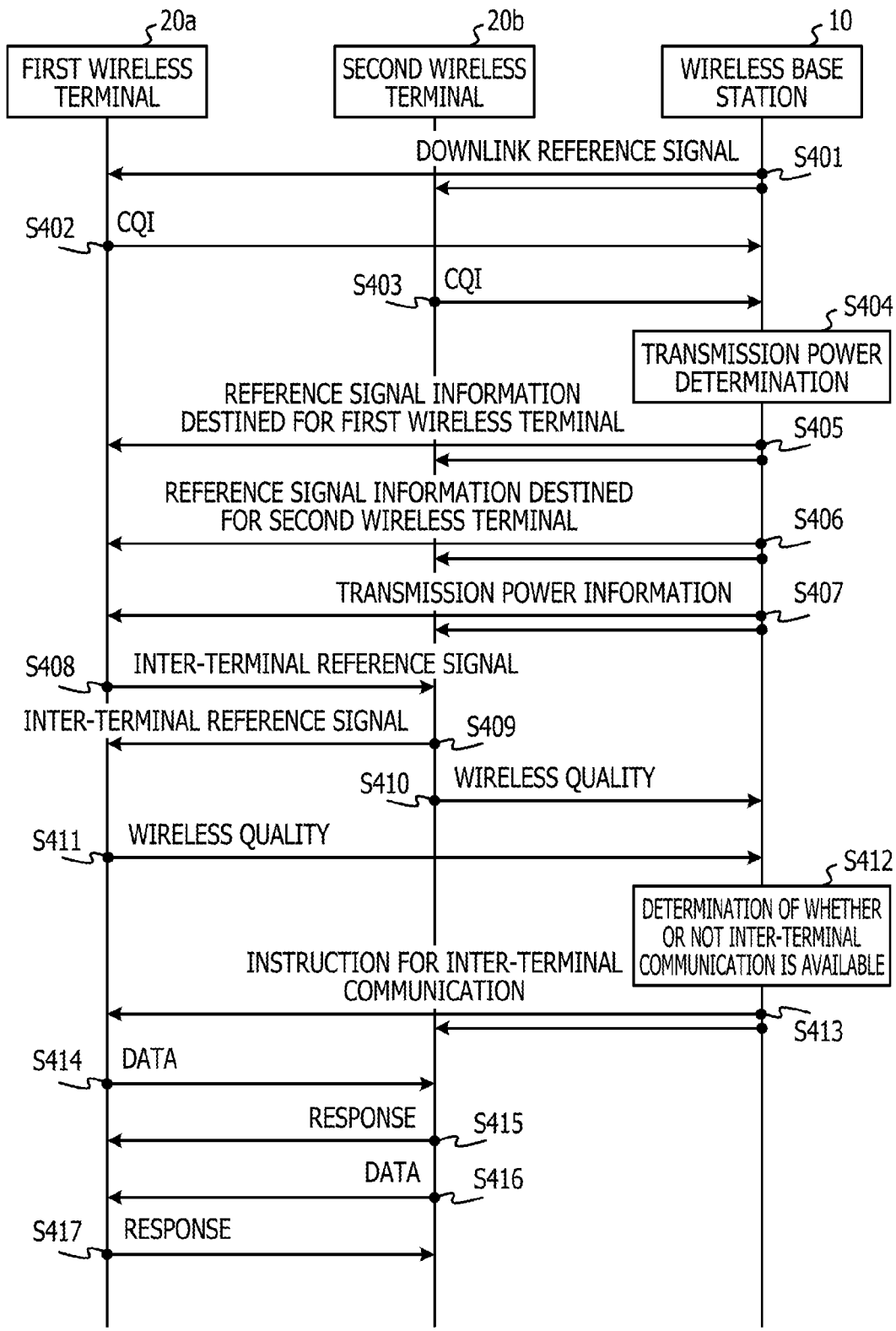
FIG. 4 is a diagram illustrating one example of a processing sequence according to a fourth embodiment of the present application.

FIG. 4 is a diagram illustrating one example of a processing sequence according to the fourth embodiment. Because preconditions for the fourth embodiment are equivalent to those according to the third embodiment, descriptions thereof are omitted here.

In S401 in FIG. 4, the wireless base station 10 transmits a downlink reference signal. The downlink reference signal is a prescribed downlink reference signal in the LTE system and is the same as that transmitted in S201 in FIG. 2. Furthermore, in S401, the first wireless terminal 20a and the second wireless terminal 20b receives the downlink reference signal.

At this time, the first wireless terminal 20a and the second wireless terminal 20b measures wireless quality (downlink wireless quality) of communication from the wireless base station 10 to each of the wireless terminals 20, based on the received downlink reference signal. At this point, the SIR or the like that is described above can be used as the wireless quality. Then, the first wireless terminal 20a and the second wireless terminal 20b generate a channel quality indicator (CQI) based on the downlink wireless quality. The CQI is an uplink indicator indicating a downlink channel quality, and one piece of uplink control information that is prescribed in the LTE system. The CQI is fed back to the wireless base station 10. Thus, the wireless base station 10 can know the downlink channel quality, and it is possible for the wireless base station 10 to perform downlink scheduling or the like.

Next, in S402 in FIG. 4, the first wireless terminal 20a transmits the CQI that is generated in S401, to the wireless base station 10. In contrast, the wireless base station 10 receives the CQI from the first wireless terminal 20a. The CQI is transmitted and receives through either of PUCCH and the PUSCH.

Furthermore, in S403, the second wireless terminal 20b transmits the CQI that is generated in S401, to the wireless base station 10. In contrast, the wireless base station 10 receives the CQI from the second wireless terminal 20b. S403 is performed in the same manner as S402.

Then, in S404 in FIG. 4, the wireless base station 10 determines the transmission power that is available when the first wireless terminal 20a and the second wireless terminal 20b transmit the inter-terminal reference signal. According to the present embodiment, as is the case with the third embodiment, the first wireless terminal 20a and the second wireless terminal 20b transmit the inter-terminal reference signal at the same transmission power. That is, in S404, the transmission power that is determined by the wireless base station 10 is in common between the first wireless terminal 20a and the second wireless terminal 20b.

The transmission power of the wireless terminal 20 by the wireless base station 10 in S404 is set to be determined in such a manner that the determination of the transmission power of the wireless terminal 20 may be determined with an arbitrary method. As a condition for this, in the determination in S404, the wireless base station 10 is set to determine the transmission power of the wireless terminal 20, considering at least the influence of the interference on the different wireless base station 10b (a different cell). The wireless base station 10 can determine the transmission power in S404 based on an arbitrary determination criterion, a rule, an algorithm, or the like, within a range not departing from the purpose described above.

One example of the method in which the wireless terminal 20 determines the transmission power in S404 is described. For example, the wireless base station 10 determines the transmission power of the wireless terminal 20 based on each of the CQIs that are received in S402 and S403. More specifically, the wireless base station 10 can determine the transmission power of the wireless terminal 20 based on the CQI that is received from the first wireless terminal 20a in S402, and on the CQI that is received from the second wireless terminal 20b in S403, in such a manner that the poorer the downlink wireless quality that is indicated by each CQI, the smaller the transmission power is. This is because the downlink wireless quality being poor means that there is a high likelihood that the wireless terminal 20 will be distant from the wireless base station 10 (the wireless terminal 20 will be positioned at the boundary of a cell), and because it is thought that in such a case, desirably, the transmission power is decreased considering the interference with the different wireless base station 10b and the like. Moreover, when the downlink is evaluated from the two CQIs, the transmission power may be determined based on the CQI that has a poor downlink wireless quality, and although the transmission power is determined based on an average value of the downlink wireless qualities that are indicated by the two CQIs, this does not matter.

Another example of the method in which the wireless terminal 20 determines the transmission power in S404 is described. In the LTE system, a technology called inter-cell interference coordination (ICIC) is known. In the ICIC, information is exchanged among cells in order to perform interference control through cooperation among the cells (among the wireless base stations 10), and two types, that is, high interference indication (HIT) and interference overload indication (OI) are prescribed as the information that is exchanged for the ICIC for uplink. In the HIT, the wireless base station 10 notifies the different wireless base station 10b of a resource block (a subcarrier) that is allocated to a user which stays at the boundary of a cell. Furthermore, in the OI, the wireless base station 10 notifies the different wireless base station 10b of a size (an interference power level) of interference power that is measured for every resource block (subcarrier).

In S404, for example, the wireless base station 10 receives the HII in advance from the different wireless base station 10b (this is not illustrated), and can determine the transmission power of the wireless terminal 20 in such a manner that the more resource blocks that are indicated by the HIT, the smaller the transmission power. There being many resource blocks that are indicated by the HII which is received from the different wireless base station 10b means that there is a high likelihood that many wireless terminals 20 will be present at the boundary of the cell of the different wireless base station 10*b*. In such a case, it is thought that the transmission power of the wireless terminal 20 is desirably decreased considering the interference with the different wireless base station 10*b* and the like.

Furthermore, in S404, for example, the wireless base station 10 receives the OI in advance from the different wireless base station 10*b* (this is not illustrated), and can determine the transmission power of the wireless terminal 20 in such a manner that the more resources that are indicated by the OI and that has a large interference power, the smaller the transmission power. There being many resource blocks that is indicated by the OI which is received from the different wireless base station 10*b* and that have a large interference power means that the different wireless base station 10*b* are greatly subject to the ambient inference. In such a case, it is thought that the transmission power of the wireless terminal 20 is desirably decreased considering the interference with the different wireless base station 10*b* and the like.

It is desirably noted that several specific examples of the determination of the transmission power of the wireless terminal 20 in S404 are described, but that these are only examples. As described above, the wireless base station 10 in S404 can determine the transmission power of the wireless terminal 20 with an arbitrary method in which at least the influence of the interference on the different wireless base station 10*b* (the different cell) is considered. It goes without saying that the specific examples described above may be suitably combined.

Because S405 to S417, which are subsequent processing operations in FIG. 4, has to be performed in the same manner as S302 to S314 in FIG. 3 according to the third embodiment, descriptions thereof are omitted here.

According to the fourth embodiment described above, as is the case with the first to third embodiments, based on the result of measuring the inter-terminal wireless quality, the wireless base station 10 can autonomously determine whether or not to perform the inter-terminal communication. Therefore, according to the fourth embodiment, the remarkable effect can be achieved that was not obtained in the LTE system in the related art or other wireless communication systems.

Furthermore, it is noted that according to the fourth embodiment, the first requirement and the second requirement that are described above are satisfied by introducing the inter-terminal reference signal. Because of this, according to the fourth embodiment, the effect in which the transmission power of the inter-terminal reference signal is equal among the terminals, and an effect in which the inter-terminal communication is difficult to be a source of interference with the different wireless base station 10*b* and the like are achieved.

Fifth Embodiment

A fifth embodiment is one embodiment that is equivalent to the specific third embodiment, as is the case with the fourth embodiment. As is the case with the third and fourth embodiments, the fifth embodiment is also one example of the embodiment, according to which the inter-terminal reference signal is used as the reference signal. According to the fifth embodiment, the wireless base station 10 determines the transmission power of the wireless terminal 20, considering the influence of interference on the different wireless base station 10*b* and the like, and the distance between the terminals.

Because the fifth embodiment has many things in common with the third embodiment, what distinguishes the fifth embodiment from the third embodiment will be described in detail below in a concentrated manner. According to the fifth embodiment, it is desirably noted that a description which overlaps the description according to the third embodiment is suitably omitted.

Figure 5:
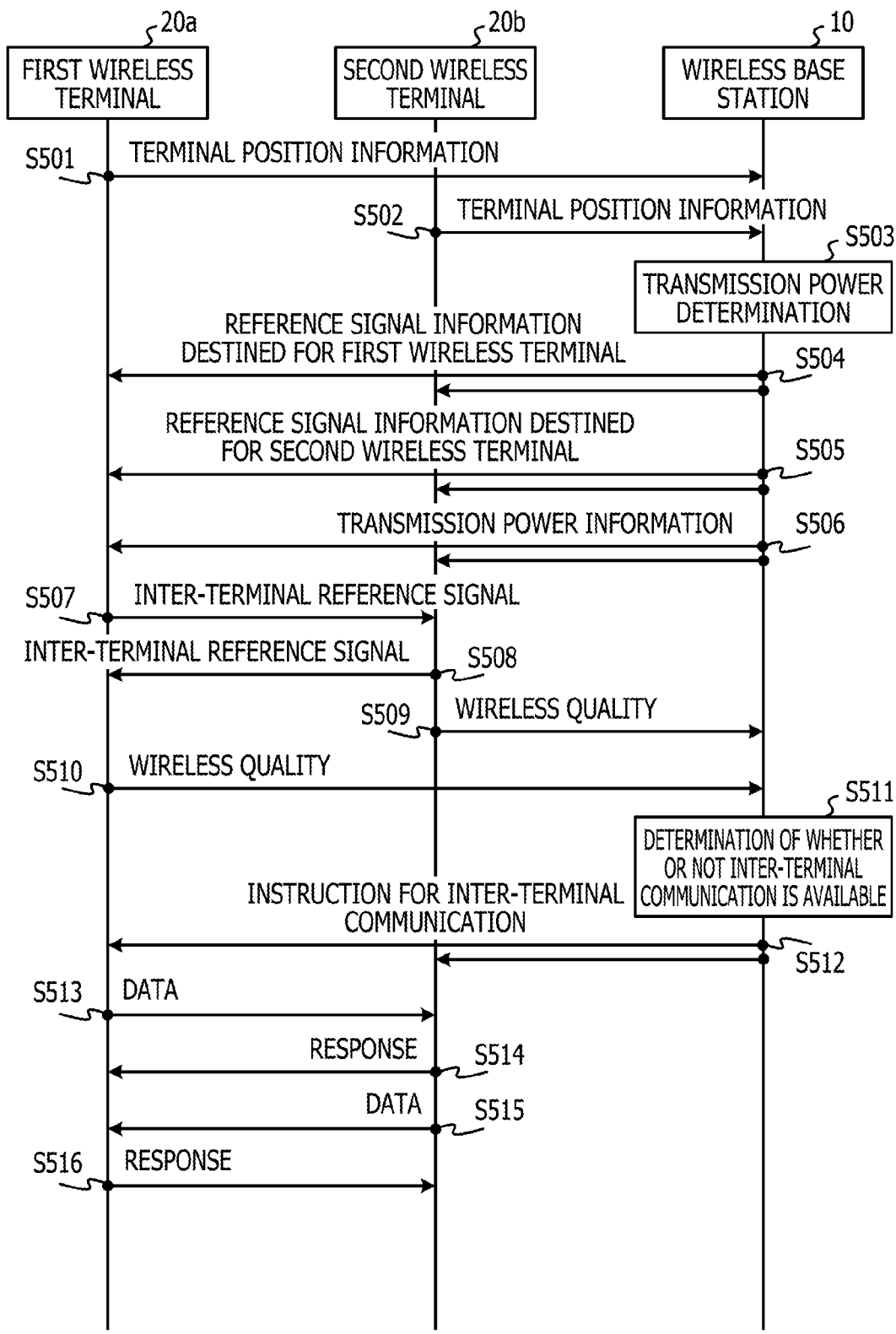
FIG. 5 is a diagram illustrating one example of a processing sequence according to a fifth embodiment of the present application.

FIG. 5 is a diagram illustrating one example of a processing sequence according to the fifth embodiment. Because preconditions for the fifth embodiment are equivalent to those according to the third embodiment, descriptions thereof are omitted here.

The first wireless terminal 20*a* in S501 in FIG. 5 transmits wireless terminal position information of the first wireless terminal 20*a* to the wireless base station 10. At this point, the wireless terminal position information is information indicating a position of the wireless terminal 20. Pieces of wireless terminal position information can include, for example, a position of the wireless terminal 20 that is position-determined by a Global Positioning System (GPS). Furthermore, the pieces of wireless terminal position information may include information indicating a position of the wireless terminal 20 that is obtained using a positioning reference signal (PRS) which is a dedicated reference signal for measuring a terminal position, which is prescribed in the LTE system. The wireless terminal position information in S501 can be transmitted with, for example, the RRC signal or the data signal. In S501, the wireless base station 10 receives the wireless terminal position information of the first wireless terminal 20*a* from the first wireless terminal 20*a*.

In S502, the second wireless terminal 20*b* transmits the wireless terminal position information of the second wireless terminal 20*b* to the wireless base station 10. In S502, the wireless base station 10 receives the wireless terminal position information of the second wireless terminal 20*b* from the second wireless terminal 20*b*. Because S502 has to be performed in the same manner as S501, a description thereof is omitted.

Then, in S503 in FIG. 5, the wireless base station 10 determines the transmission power that is available when the first wireless terminal 20*a* and the second wireless terminal 20*b* transmit the inter-terminal reference signal. According to the present embodiment, as is the case with the third and fourth embodiments, the first wireless terminal 20*a* and the second wireless terminal 20*b* transmit the inter-terminal reference signal at the same transmission power. That is, in S503, the transmission power that is determined by the wireless base station 10 is in common between the first wireless terminal 20*a* and the second wireless terminal 20*b*.

The transmission power of the wireless terminal 20 by the wireless base station 10 in S503 is set to be determined in such a manner that the transmission power of the wireless terminal 20 may be determined with an arbitrary method. As a condition for this, in the determination in S503, the wireless base station 10 is set to determine the transmission power of the wireless terminal 20, considering at least the influence of the interference on the different wireless base station 10*b* (the different cell), and the distance between the terminals. The wireless base station 10 can determine the transmission power in S503 based on an arbitrary determination criterion, a rule, an algorithm, or the like, within a range not departing from the purpose described above.

One example of the method in which the wireless terminal 20 determines the transmission power in S503 is described. For example, the wireless base station 10 determines the transmission power of the wireless terminal 20 based on each of the pieces of the wireless terminal position information that are received in S501 and S502. More specifically, first, the wireless base station 10 calculates a distance between the wireless base station 10 and each of the wireless terminals 20 based on the wireless terminal position information that is received from the first wireless terminal 20a in S501 and on the wireless terminal position information that is received from the second wireless terminal 20b in S502 (the wireless base station 10 is set to recognize a position of itself in advance). Furthermore, the distance between the terminals is calculated based on the two pieces of wireless terminal position information. Then, the wireless base station 10 can determine the transmission power of the wireless terminal 20 based on the distance between the wireless base station 10 and each of the wireless terminals 20, and on the distance between the terminals.

For example, in a case where the distance between the wireless base station 10 and each of the wireless terminals 20 is comparatively great, regardless of how far the terminals are apart from one another, the wireless base station 10 can decrease the transmission power of the wireless terminal 20. This is because the interference with the different wireless base station 10b, has to be suppressed. Furthermore, for example, in a case where the distance between the wireless base station 10 and each of the wireless terminals 20 is comparatively small, the wireless base station 10 can increase the transmission power of the wireless terminal 20 when the distance between the terminals is great, and can decrease the transmission power of the wireless terminal 20 when the distance between the terminals is small. This is because it is thought that the interference with the different wireless base station 10b is small and thus because it is thought that it is convenient to determine the transmission power according to the distance between the terminals.

Because S504 to S516, which are subsequent processing operations in FIG. 5, has to be performed in the same manner as S302 to S314 in FIG. 3 according to the third embodiment, descriptions thereof are omitted here.

According to the fifth embodiment described above, as is the case with the first to fourth embodiments, based on the result of measuring the inter-terminal wireless quality, the wireless base station 10 can autonomously determine whether or not to perform the inter-terminal communication. Therefore, according to the fifth embodiment, the remarkable effect can be achieved that was not obtained in the LTE system in the related art or other wireless communication systems.

Furthermore, it is noted that according to the fifth embodiment, the first requirement to the third requirement that are described above are satisfied by introducing the inter-terminal reference signal. Because of this, according to the fifth embodiment, in addition to the effect in which the transmission power of the inter-terminal reference signal is equal among the terminals and the effect in which the inter-terminal communication is difficult to be a source of interference with the different wireless base station 10b, an effect in which it is easy for the reception power of the inter-terminal reference signal to become fixed.

[Network Configuration of Wireless Communication System According to Each Embodiment]

Figure 6:
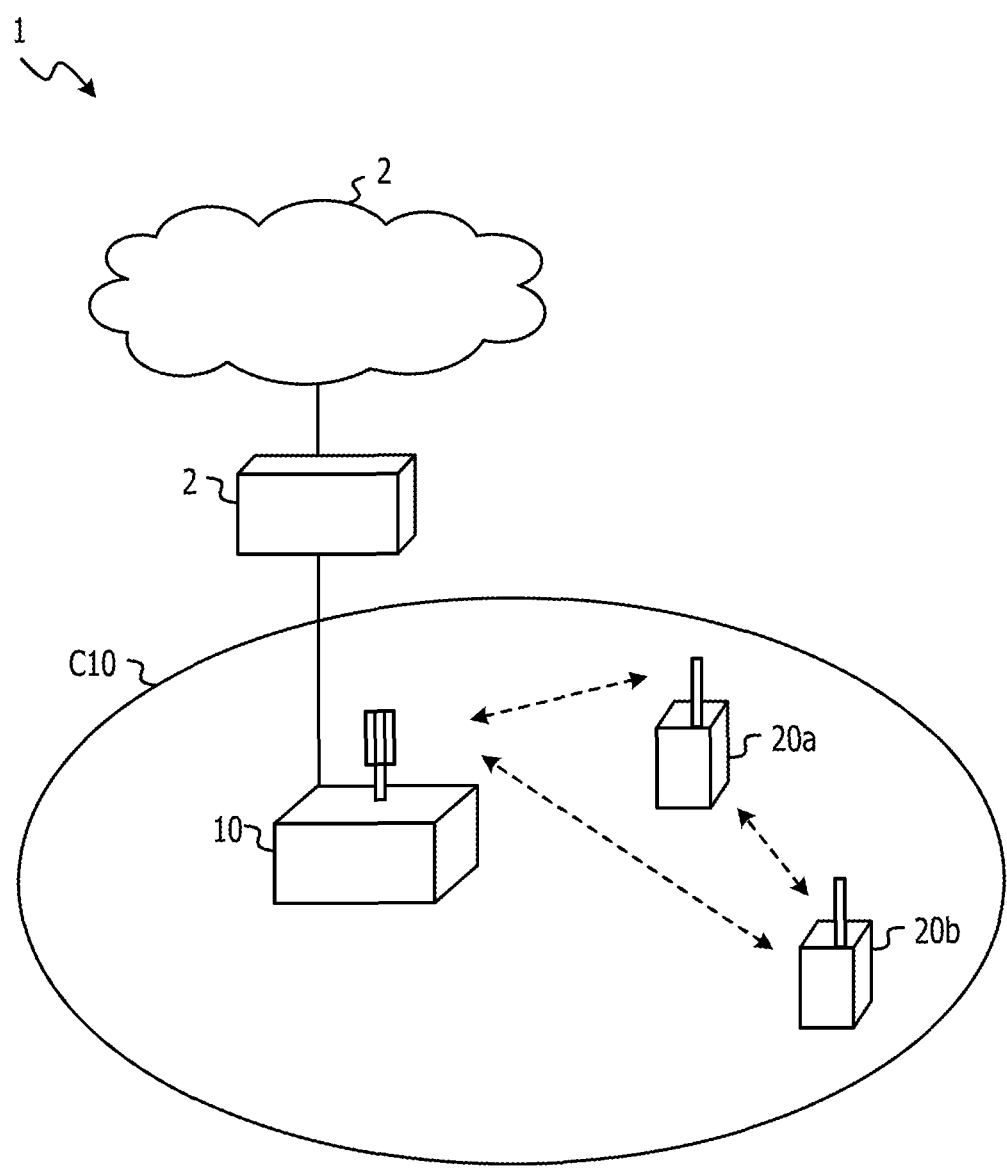
FIG. 6 is a diagram illustrating one example of a network configuration of a wireless communication system according to each embodiment.

Next, a network configuration of a wireless communication system 1 according to each embodiment is described referring to FIG. 6. As illustrated in FIG. 6, the wireless communication system 1 has the wireless base station 10 and the wireless terminal 20. Moreover, two wireless terminals 20, that is, the wireless terminal 20a and the wireless terminal 20b are illustrated in FIG. 6, but it goes without saying that this is only an example. The wireless base station 10 forms a cell C10. The wireless terminal 20 is present within the cell C10. Moreover, it is desirably noted that in the present application, the wireless base station 10 is referred to as a "transmission base station", and the wireless terminal 20 is referred to as a "reception base station".

The wireless base station 10 is connected to a network device 3 through a wired connection, and the network device 3 is connected to a network 2 through the wired connection. The wireless base station 10 is provided in such a manner that it is possible for the wireless base station 10 to transmit and receive data or control information to and from a different wireless base station 10 through the network device 3 and the network 2.

The wireless base station 10 may be made up of separate devices. One has a function of performing wireless communication with the wireless terminal 20, and the other has a function of performing digital signal processing and a control function. In this case, the device equipped with the wireless communication function is referred to as a remote radio head (RRH), and the device equipped with the digital signal processing and the control function is referred to as a base band unit (BBU). The RRH may be installed in a state of protruding from the BBU, and an optical fiber and the like may provide a connection between the RRH and the BBU in the wired manner. Furthermore, the wireless base stations 10 may include not only a macro wireless base station 10 and small-sized wireless base stations 10 (including a micro wireless base station 10, a femto wireless base station 10, and the like), such as a pico wireless base station 10, but also variously-sized wireless base stations 10. Furthermore, in a case where a relay base station is used that relays wireless communication between the wireless base station 10 and the wireless terminal 20, the relay base station (transmission to and reception from the wireless terminal 20 and control of the transmission and reception) may also be set to be included in the wireless base station 10 in the present application.

On the other hand, the wireless terminal 20, as illustrated in FIG. 6, performs communication with the wireless base station 10 using the wireless communication. Furthermore, in FIG. 6, as one example, the wireless terminal 20a and the wireless terminal 20b perform the inter-terminal communication. In this manner, the wireless terminal 20 performs the inter-terminal communication with the different wireless terminal 20.

The wireless terminals 20 may include a portable telephone, a smartphone, a personal digital assistant (PDA), a personal computer, and wireless terminals 20 such as various apparatuses or devices (a sensing device or the like) that are equipped with the wireless communication function. Furthermore, in the case where the relay base station is used that relays the wireless communication between the wireless base station 10 and the wireless terminal 20, the relay base station (transmission to and reception from the wireless base station 10 and control of the transmission and reception) may also be set to be included in the wireless terminal 20 in the present application.

The network device 3, for example, includes a communication unit and a control unit. These constituent elements are connected to one another in such a manner that a signal or data is possible to input and output in a one-way direction or in a two-way direction. The network device 3, for example, is realized by a gateway. As a hardware configuration of the network device 3, for example, the communication unit is realized as an interface circuit, and the control unit is realized as a processor and a memory.

Moreover, specific aspects of distribution or integration of constituent elements of the wireless base station 10 and the wireless terminal 20 are not limited to aspects of the first embodiment. A configuration can be provided in which all or some of the constituent elements are distributed or integrated functionally or physically in arbitrary units according to various loads, an operating condition, or the like. For example, a connection to the memory as an external device of the wireless base station 10 and the wireless terminal 20 may be set to be established through a network or a cable.

[Functional Configuration of Each Device in the Wireless Communication System According to Each Embodiment]

Figure 7:
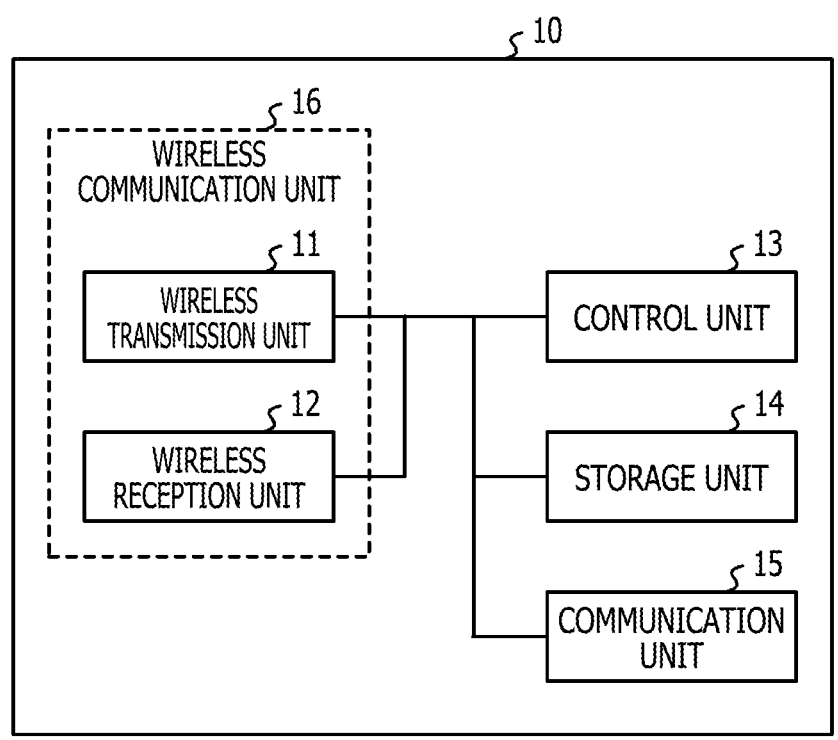
FIG. 7 is one example of a functional configuration diagram of a wireless base station in the wireless communication system according to each embodiment.
Figure 8:
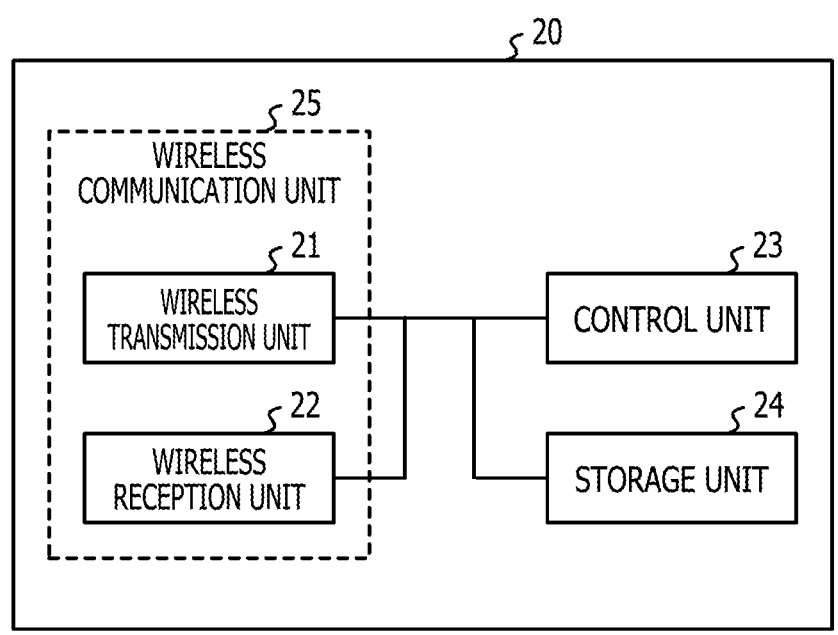
FIG. 8 is one example of a functional configuration diagram of a wireless terminal in the wireless communication system according to each embodiment.

Next, referring to FIGS. 7 and 8, a functional configuration of each device in a wireless communication system according to each embodiment is described. Moreover, it is desirably noted that, as described above, when the term wireless terminal 20 is used, the wireless terminals 20 include the first wireless terminal 20a and the second wireless terminal 20b according to each embodiment described above.

FIG. 7 is a functional block diagram illustrating one example of a configuration of the wireless base station 10. As illustrated in FIG. 7, the wireless base station 10 includes, for example, a wireless transmission unit 11, a wireless reception unit 12, a control unit 13, a storage unit 14, and a communication unit 15. These constituent components are connected to one another in such a manner that a signal or data is possible to input and output in a one-way direction or in a two-way direction. Moreover, the wireless transmission unit 11 and the wireless reception unit 12 are collectively referred to as a wireless communication unit 16.

The wireless transmission unit 11 transmits a data signal or a control signal through an antenna using the wireless communication. Moreover, the antenna may be shared for transmission and reception. The wireless transmission unit 11 transmits a wireless signal (a downlink wireless signal) to the wireless terminal 20. The wireless signal that is transmitted by the wireless transmission unit 11 can include arbitrary user data or control information (according to the control information, coding, modulation, or the like is performed), reference signal, or the like, which is destined for the wireless terminal 20.

As a specific example of the wireless signal that is transmitted by the wireless transmission unit 11, each wireless signal (indicated by an arrow in the drawings) that is transmitted by each wireless base station 10 to the wireless terminal 20 in FIGS. 1 to 5 is given. The pieces of wireless signal that are transmitted by the wireless transmission unit 11 are not limited to these, and include all wireless signals that are transmitted by each wireless base station 10 to the wireless terminal 20 according to each embodiment described above and a modification example.

The wireless reception unit 12 receives a data signal or a control signal through an antenna using the wireless communication. The wireless reception unit 12 receives a wireless signal (an uplink wireless signal) from the wireless terminal 20. The wireless signal that is received by the wireless reception unit 12 can include arbitrary user data or control information (according to the control information, the coding, the modulation, or the like is performed), reference signal, or the like, which is transmitted by the wireless terminal 20.

As a specific example of the wireless signal that is received by the wireless reception unit 12, each wireless signal (indicated by an arrow in the drawings) that is received by each wireless base station 10 from the wireless terminal 20 in FIGS. 1 to 5 is given. The wireless signals that are received by the wireless reception unit 12 are not limited to these, and include all wireless signals that are received by each wireless base station 10 from the wireless terminal 20 according to each embodiment described above and the modification example.

The control unit 13 outputs data or control information that is transmitted to the wireless terminal 20, to the wireless transmission unit 11. The control unit 13 inputs data or control information that is received from the wireless terminal 20, from the wireless reception unit 12. The control unit 13 inputs and outputs data, control information, a program, and the like between the control unit 13 and the storage unit 14 that will be described below. The control unit 13 inputs and outputs data or control information that is transmitted and received to and from the other party such as the different wireless base station 10, between the communication unit 15 that will be described below. In addition to these, the control unit 13 performs various control operations in the wireless base station 10.

As specific examples of processing that is controlled by the control unit 13, control for each signal (indicated by an arrow in the drawings) that is transmitted and received by the wireless base station 10 in FIGS. 1 to 5, and control for each processing operation (indicated by a rectangle in the drawings) that is performed by the wireless base station 10 are given. Processing operations that are controlled by the control unit 13 are not limited to these, and include types of control relating to all processing operations that are performed by each wireless base station 10 according to each embodiment described above and the modification example.

Various pieces of information, such as data, control information, a program, are stored in the storage unit 14. The various pieces of information that are stored in the storage unit 14 include all pieces of information that are stored in each wireless base station 10 according to each embodiment described above and the modification example.

The communication unit 15 transmits and receives data or control information to and from the other party such as the different wireless base station 10, through a wired signal (a wireless signal is possible) and the like. As specific examples of the wired signal and the like that is transmitted and received by the communication unit 15, a wired signal and the like that each wireless base station 10 transmits and receives to and from the other party that is the different wireless base station 10 are given. The wired signal and the like that are transmitted and received by the communication unit 15 are not limited to these, and include all wired signals and the like that each wireless base station 10 transmits and receives to and from the other party that is the different wireless base station 10 or the like.

Moreover, although the wireless base station 10 transmits and receives a wireless signal to and from a wireless communication device (for example, a different wireless base station 10 or the relay base station) other than the wireless terminal 20 through the wireless transmission unit 11 or the wireless reception unit 12, this does not matter.

FIG. 8 is a functional block diagram illustrating one example of a configuration of the wireless terminal 20. As illustrated in FIG. 8, the wireless terminal 20 includes, for example, a wireless transmission unit 21, a wireless reception unit 22, a control unit 23, and a storage unit 24. These constituent components are connected to one another in such a manner that a signal or data is possible to input and output in a one-way direction or in a two-way direction. Moreover, the wireless transmission unit 21 and the wireless reception unit 22 are collectively referred to as a wireless communication unit 25.

The wireless transmission unit 21 transmits a data signal or a control signal through an antenna using the wireless communication. Moreover, the antenna may be shared for transmission and reception. The wireless transmission unit 21 transmits the wireless signal (the uplink wireless signal) to each wireless base station 10. The wireless signal that is transmitted by the wireless transmission unit 21 can include arbitrary user data or control information (according to the control information, the coding, the modulation, or the like is performed), reference signal, or the like, which is destined for each wireless base station 10.

Furthermore, the wireless transmission unit 21 can transmit the wireless signal to a different wireless terminal 20 (the inter-terminal communication). The wireless signal that is transmitted by the wireless transmission unit 21 can include arbitrary user data or control information (according to the control information, the coding, the modulation, or the like is performed), reference signal, or the like, which is destined for the different wireless terminal 20.

As specific examples of the wireless signal that is transmitted by the wireless transmission unit 21, each wireless signal (indicated by an arrow in the drawings) that is transmitted by the wireless terminal 20 to each wireless base station 10 in FIGS. 1 to 5, and each wireless signal that is transmitted by the wireless terminal 20 to the different wireless terminal 20 are given. The pieces of wireless signal that are transmitted by the wireless transmission unit 21 are not limited to these, and include all wireless signals that are transmitted by the wireless terminal 20 to each wireless base station 10 according to each embodiment described above and the modification example, and all wireless signals that are transmitted by the wireless terminal 20 to the different wireless terminal 20.

The wireless reception unit 22 receives a data signal or a control signal through an antenna using the wireless communication. The wireless reception unit 22 receives the wireless signal (the downlink wireless signal) from each wireless base station 10. The wireless signal that is received by the wireless reception unit 22 can include arbitrary user data or control information (according to the control information, the coding, the modulation, or the like is performed), reference signal, or the like, which is transmitted by the each wireless base station 10.

Furthermore, the wireless reception unit 22 can receive the wireless signal from the different wireless terminal 20 (the inter-terminal communication). The wireless signal that is transmitted by the wireless reception unit 22 can include arbitrary user data or control information (according to the control information, the coding, the modulation, or the like is performed), reference signal, or the like, from the different wireless terminal 20.

As specific examples of the wireless signal that is received by the wireless reception unit 22, each wireless signal (indicated by an arrow in the drawings) that is received by the wireless terminal 20 from the wireless base station 10 in FIGS. 1 to 5, and each wireless signal that is received by the wireless terminal 20 from the different wireless terminal 20 are given. The pieces of wireless signal that are received by the wireless reception unit 22 are not limited to these, and include all wireless signals that are received by the wireless terminal 20 from each wireless base station 10 according to each embodiment described above and the modification example, and all wireless signals that are received by the wireless terminal 20 from the different wireless terminal 20.

The control unit 23 outputs data or control information that is transmitted to each wireless base station 10, to the wireless transmission unit 21. The control unit 23 inputs data or control information that is received from each wireless base station 10, into the wireless reception unit 22. The control unit 23 inputs and outputs data, control information, a program, and the like between the control unit 23 and the storage unit 24 that will be described below. In addition to these, the control unit 23 performs various control operations in the wireless terminal 20.

As specific examples of processing that is controlled by the control unit 23, control for each signal (indicated by an arrow in the drawings) that is transmitted and received by the wireless terminal 20 in FIGS. 1 to 5, and control for each processing operation (indicated by a rectangle in the drawings) that is performed by the wireless terminal 20 are given. Processing operations that are controlled by the control unit 23 are not limited to these, and include types of control relating to all processing operations that are performed by the wireless terminal 20 according to each embodiment described above and the modification example.

Various pieces of information, such as data, control information, a program, are stored in the storage unit 24. The various pieces of information that are stored in the storage unit 24 include all pieces of information that are stored in the wireless terminal 20 according to each embodiment described above and the modification example.

Moreover, although the wireless terminal 20 transmits and receives a wireless signal to and from a wireless communication device other than the wireless base station 10 through the wireless transmission unit 21 or the wireless reception unit 22, this does not matter.

[Hardware Configuration of Each Device in Wireless Communication System According to Each Embodiment]

Figure 9:
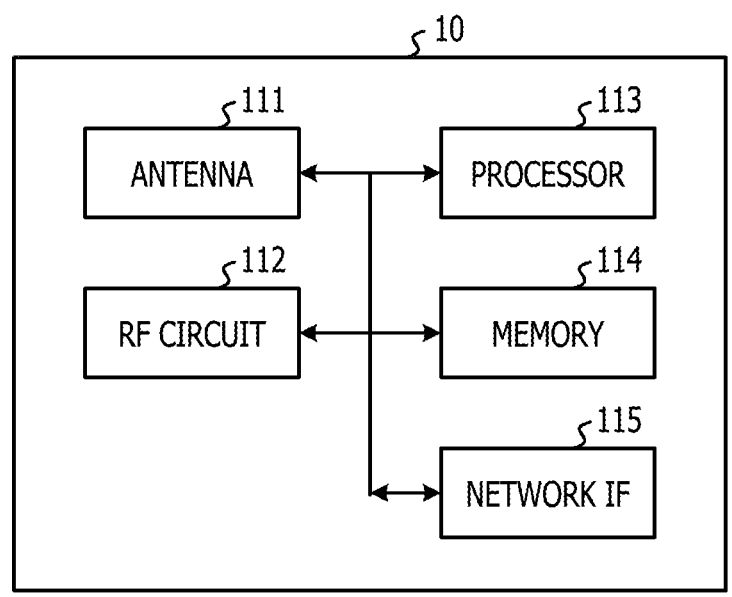
FIG. 9 is one example of a hardware configuration diagram of the wireless terminal in the wireless communication system according to each embodiment.
Figure 10:
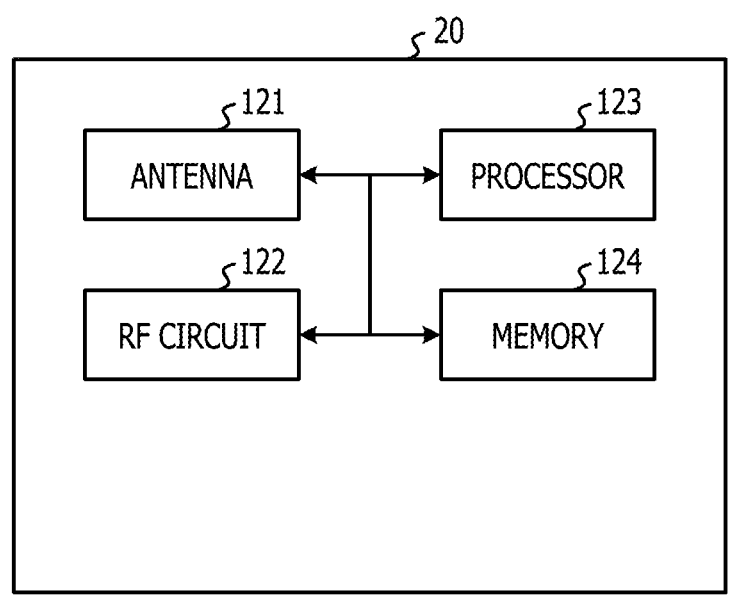
FIG. 10 is one example of the hardware configuration diagram of the wireless terminal in the wireless communication system according to each embodiment.

A hardware configuration of each device in a wireless communication system according to each embodiment and each modification example is described referring to FIGS. 9 and 10. Moreover, it is desirably noted that, as described above, when the term wireless terminal 20 is used, the wireless terminals 20 include the first wireless terminal 20a and the second wireless terminal 20b according to each embodiment described above.

FIG. 9 is a diagram illustrating one example of a hardware configuration of the wireless base station 10. As illustrated in FIG. 9, the wireless base station 10 has, for example, a radio frequency (RF) circuit 112 including an antenna 111, a processor 113, a memory 114, and a network interface (IF) 115, as hardware constituent elements. These constituent elements are connected to one another in such a manner that various signals or pieces of data are possible to input and output through a bus.

The processor 113 is, for example, a central processing unit (CPU) or a digital signal processor (DSP). Although the processor 113 is realized as a digital electronic circuit, this does not matter in the present application. For example, as the digital electronic circuits, for example, an application-specific integrated circuit (ASIC), a field-programming gate array (FPGA), a large scale integration (LSI), and the like are given.

The memories 114 include at least any one of a random access memory (RAM), for example, such as a synchronous dynamic random access memory (SDRAM), a read only memory (ROM), and a flash memory. A program, control information, or data is stored in the memory 114. In addition, the wireless base station may include an auxiliary storage device (hard disk or the like) and the like, which are not illustrated.

A correspondence between a functional configuration of the wireless base station 10 that is illustrated in FIG. 7 and a hardware configuration of the wireless base station 10 that is illustrated in FIG. 9 is described. The wireless transmission unit 11 and the wireless reception unit 12 (or the wireless communication unit 16) are realized as, for example, an RF circuit 112, or the antenna 111 and the RF circuit 112. The control unit 13 is realized as, for example, the CPU 113, the memory 114, the digital electronic circuit and the like that are not illustrated. The storage unit 14 is realized as, for example, the memory 114. The communication unit 15 is realized as, for example, a network I/F 115.

FIG. 10 is a diagram illustrating one example of the hardware configuration of the wireless terminal 20. As illustrated in FIG. 10, the wireless terminal 20 includes, for example, a radio frequency (RF) circuit 122 including an antenna 121, a processor 123, and a memory 124, as hardware constituent elements. These constituent elements are connected to one another in such a manner that various signals or pieces of data are possible to input and output through a bus.

The processor 123 is, for example, a central processing unit (CPU) or a digital signal processor (DSP). Although the processor 123 is realized as a digital electronic circuit, this does not matter in the present application. For example, as the digital electronic circuits, for example, an application-specific integrated circuit (ASIC), a field-programming gate array (FPGA), a large scale integration (LSI), and the like are given.

The memories 124 include at least any one of a random access memory (RAM), for example, such as a synchronous dynamic random access memory (SDRAM), a read only memory (ROM), and a flash memory. A program, control information, or data is stored in the memory 124.

A correspondence between a functional configuration of the wireless terminal 20 that is illustrated in FIG. 8 and a hardware configuration of the wireless terminal 20 that is illustrated in FIG. 10 is described. The wireless transmission unit 21 and the wireless reception unit 22 (or the wireless communication unit 25) are realized as, for example, an RF circuit 122, or the antenna 121 and the RF circuit 122. The control unit 23 is realized as, for example, the CPU 123, the memory 124, the digital electronic circuit and the like that are not illustrated. The storage unit 24 is realized as, for example, the memory 124.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication method comprising:
    transmitting third information from a wireless base station to a first wireless terminal and a second wireless terminal, the third information including information indicating a first transmission power of a first reference signal;
    transmitting fourth information from the wireless base station to the second wireless terminal and the first wireless terminal, the fourth information including information indicating a second transmission power of a second reference signal;
    transmitting the first reference signal from the first wireless terminal with a transmission power based on the first transmission power indicated by the third information;
    transmitting the second reference signal from the second wireless terminal with a transmission power based on the second transmission power indicated by the fourth information;
    transmitting first information from the second wireless terminal to the wireless base station, the first information relating to a first wireless quality from the first wireless terminal to the second wireless terminal, the first wireless quality being measured by the second wireless terminal based on the third information and the first reference signal transmitted from the first wireless terminal;
    transmitting second information from the first wireless terminal to the wireless base station, the second information relating to a second wireless quality from the second wireless terminal to the first wireless terminal, the second wireless quality being measured by the first wireless terminal based on the fourth information and a second reference signal transmitted from the second wireless terminal; and
    determining, by the wireless base station, whether device-to-device communication is performed between the first wireless terminal and the second wireless terminal, in accordance with the first information and the second information.

2. The wireless communication method according to claim 1, wherein
    the third information and the fourth information are transmitted within a same wireless signal.

3. The wireless communication method according to claim 1, wherein
    the first reference signal and the second reference signal are not received by the wireless base station.

4. The wireless communication method according to claim 1, further comprising:
    transmitting fifth information from the first wireless terminal to the wireless base station, the fifth information indicating a first position of the first wireless terminal;
    transmitting sixth information from the second wireless terminal to the wireless base station, the sixth information indicating a second position of the second wireless terminal;
    calculating, by the wireless base station, a first distance between the first wireless terminal and the second wireless terminal in accordance with the first position indicated by the fifth information and the second position indicated by the sixth information;
    calculating, by the wireless base station, a second distance between the first wireless terminal and the wireless base station in accordance with the first position indicated by the fifth information and a position of the wireless base station;
    calculating, by the wireless base station, a third distance between the second wireless terminal and the wireless base station in accordance with the second position indicated by the sixth information and a position of the wireless base station;
    determining, by the wireless base station, the first transmission power in accordance with the first distance and the second distance;
    determining, by the wireless base station, the second transmission power in accordance with the first distance and the third distance.

5. A wireless communication system comprising:
a first wireless terminal;
a second wireless terminal; and
a wireless base station configured to determine whether device-to-device communication is performed between the first wireless terminal and the second wireless terminal, wherein
the wireless base station is configured to
   transmit third information to the first wireless terminal and the second wireless terminal, the third information including information indicating a first transmission power of a first reference signal,
   transmit fourth information to the second wireless terminal and the first wireless terminal, the fourth information including information indicating a second transmission power of a second reference signal,
the first wireless terminal is configured to
   transmit the first reference signal with a transmission power based on the first transmission power indicated by the third information,
the second wireless terminal is configured to
   transmit the second reference signal with a transmission power based on the second transmission power indicated by the fourth information,
the first wireless terminal is configured to
   transmit second information to the wireless base station, the second information relating to a second wireless quality from the second wireless terminal to the first wireless terminal, the second wireless quality being measured based on the fourth information and the second reference signal transmitted from the second wireless terminal,
the second wireless terminal is configured to
   transmit first information to a wireless base station, the first information relating to a first wireless quality from a first wireless terminal to the second wireless terminal, the first wireless quality being measured based on the third information and the first reference signal transmitted from the first wireless terminal.

6. A wireless base station comprising:
a memory; and
a processor coupled to the memory and configured to:
   transmit third information to a first wireless terminal and a second wireless terminal, the third information including information indicating a first transmission power of a first reference signal;
   transmit fourth information to the second wireless terminal and the first wireless terminal, the fourth information including information indicating a second transmission power of a second reference signal;
   receive first information from the second wireless terminal and second information from the first wireless terminal, the first information relating to a first wireless quality from the first wireless terminal to the second wireless terminal, the first wireless quality being measured based on the first reference signal transmitted from the first wireless terminal in accordance with the first transmission power indicated by the third information, the second information relating to a second wireless quality from the second wireless terminal to the first wireless terminal, the second wireless quality being measured based on the second reference signal transmitted from the second wireless terminal in accordance with the second transmission power indicated by the fourth information; and
   determine whether device-to-device communication is performed between a first wireless terminal and a second wireless terminal, in accordance with the first information and the second information.

7. A wireless terminal comprising:
a memory; and
a processor coupled to the memory and configured to:
   receive third information from a wireless base station, the third information including information indicating a first transmission power of a first reference signal;
   receive fourth information from the wireless base station, the fourth information including information indicating a second transmission power of a second reference signal;
   transmit the first reference signal with a transmission power based on the first transmission power indicated by the third information;
   measure second wireless quality from another wireless terminal to the wireless terminal, in accordance with the fourth information and the second reference signal transmitted from the another wireless terminal, the another wireless terminal being configured to transmit the second reference signal with a transmission power based on the second transmission power indicated by the fourth information;
   transmit second information to the wireless base station, the second information relating to the second wireless quality, the wireless base station being configured to determine whether device-to-device communication is performed between the wireless terminal and the another wireless terminal in accordance at least with the second information.

* * * * *